US006867801B1

(12) United States Patent
Akasawa et al.

(10) Patent No.: US 6,867,801 B1
(45) Date of Patent: Mar. 15, 2005

(54) ELECTRONIC STILL CAMERA HAVING PHOTOGRAPHED IMAGE REPRODUCING FUNCTION

(75) Inventors: Mitsuyuki Akasawa, Fuchu (JP); Junichi Miyasaka, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/297,011

(22) PCT Filed: Aug. 28, 1998

(86) PCT No.: PCT/JP98/03851

§ 371 (c)(1),
(2), (4) Date: Apr. 23, 1999

(87) PCT Pub. No.: WO99/12341

PCT Pub. Date: Mar. 11, 1999

(30) Foreign Application Priority Data

Sep. 3, 1997 (JP) .............................. 9-238440

(51) Int. Cl.⁷ .......................... H04N 5/228; H04N 5/76; H04N 5/222; G09G 5/00
(52) U.S. Cl. .................... 348/222.1; 348/231; 348/333; 345/633; 345/635
(58) Field of Search ........................... 348/333, 207.99, 348/239, 220.1, 221.1, 231.1–231.9; 345/633, 635

(56) References Cited

U.S. PATENT DOCUMENTS

| 5,023,720 | A | * | 6/1991 | Jardins ........................ 348/588 |
| 5,138,460 | A | * | 8/1992 | Egawa ........................ 348/239 |
| 5,619,738 | A | | 4/1997 | Petruchik et al. |
| 5,666,459 | A | * | 9/1997 | Ohta et al. ..................... 348/39 |
| 5,682,197 | A | * | 10/1997 | Moghadam et al. ..... 348/222.1 |
| 6,128,416 | A | * | 10/2000 | Oura .......................... 348/239 |
| 6,441,854 | B2 | * | 8/2002 | Fellegara et al. ...... 348/333.13 |
| 6,657,667 | B1 | * | 12/2003 | Anderson .............. 348/333.12 |

FOREIGN PATENT DOCUMENTS

| EP | 0 738 075 A2 | | 10/1996 | |
| EP | 0 762 264 A1 | | 3/1997 | |
| GB | 2257325 | * | 1/1993 | .......... H04N/7/087 |
| JP | 2-250468 | | 10/1990 | |
| JP | 3-34778 | | 2/1991 | |
| JP | 03-296096 | * | 12/1991 | ............ G09G/5/34 |
| JP | 4-018871 A | | 1/1992 | |
| JP | 5-219428 | | 8/1993 | |
| JP | 05142682 A | * | 11/1993 | ........... G03B/37/00 |
| JP | 7-099623 A | | 4/1995 | |

* cited by examiner

Primary Examiner—Andrew Christensen
Assistant Examiner—Nhan Tran
(74) Attorney, Agent, or Firm—Frishauf, Holtz, Goodman & Chick, P.C.

(57) ABSTRACT

In a digital camera (1), when a "+" key (17a) or a "−" key. (17b) is depressed to select reproduction/display of a panorama image after the reproduction mode is designated, the CPU (36) reads out the selected panorama image data from a flash memory (31), and stores it in a VRAM (26). When the "+" key (17a) or the "−" key (17b) is depressed after the first 1-frame image data of the panorama image data stored in the VRAM (26) is reproduced/displayed on the display screen of the display unit (12), the CPU (36) starts scrolling the displayed image on the display screen of the display unit (12).

15 Claims, 22 Drawing Sheets

DISPLAY SCREEN IN PHOTOGRAPHING
OPERATION FOR FIRST IMAGE

DISPLAY SCREEN IN PHOTOGRAPHING
OPERATION FOR SECOND OR SUBSEQUENT IMAGE

FIRST SENSED IMAGE

DISPLAY SCREEN IN PHOTOGRAPHING OPERATION FOR SECOND IMAGE

SECOND SENSED IMAGE

FIG.10A
DISPLAY SCREEN SET IN PHOTOGRAPHING
OPERATION FOR SECOND OR SUBSEQUENT IMAGE
WHEN PHOTOGRAPHING DIRECTION OF
PANORAMA IMAGE IS SET TO HORIZONTAL
DIRECTION FROM RIGHT TO LEFT

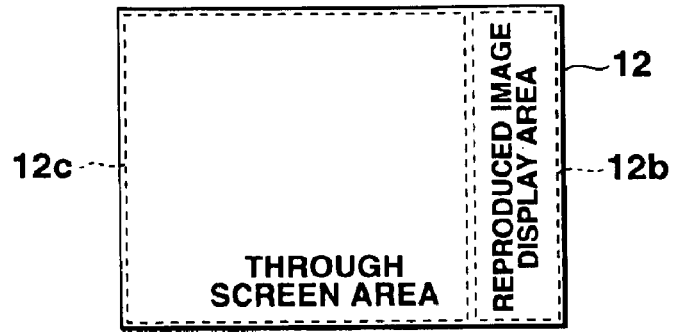

FIG.10B
DISPLAY SCREEN SET IN PHOTOGRAPHING
OPERATION FOR SECOND OR SUBSEQUENT IMAGE
WHEN PHOTOGRAPHING DIRECTION OF
PANORAMA IMAGE IS SET TO VERTICAL
DIRECTION FROM BOTTOM TO TOP

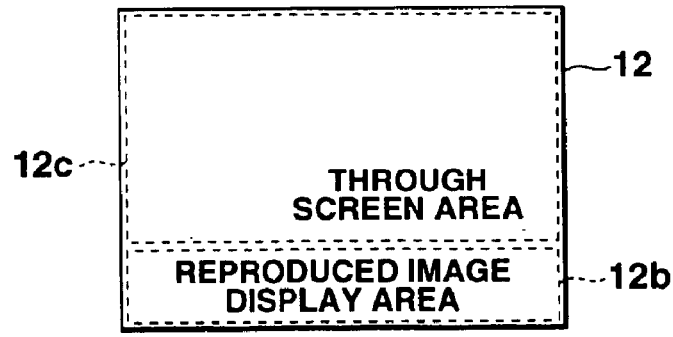

FIG.10C
DISPLAY SCREEN SET IN PHOTOGRAPHING
OPERATION FOR SECOND OR SUBSEQUENT IMAGE
WHEN PHOTOGRAPHING DIRECTION OF
PANORAMA IMAGE IS SET TO VERTICAL
DIRECTION FROM TOP TO BOTTOM

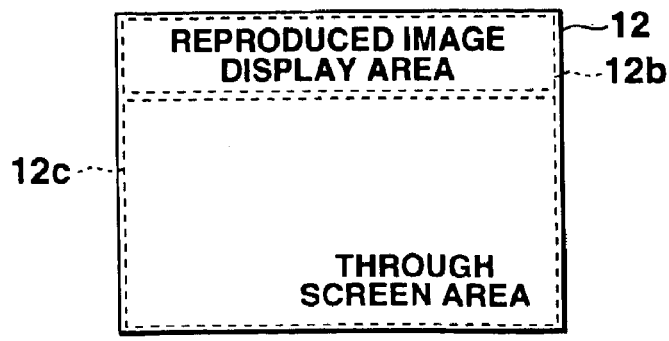

FIRST SENSED IMAGE — CORRESPONDING TO 12b3

CORRESPONDING TO 12b4

CORRESPONDING TO 12b2

CORRESPONDING TO 12b1

DISPLAY SCREEN IN PHOTOGRAPHING OPERATION FOR SECOND OR SUBSEQUENT IMAGE

REPRODUCED IMAGE DISPLAY AREA 12b1~12b4

(MODIFICATION 2 OF FIG.14)

FIG.20A
PLURALITY OF IMAGE DATA SENSED IN PANORAMA PHOTOGRAPHING MODE
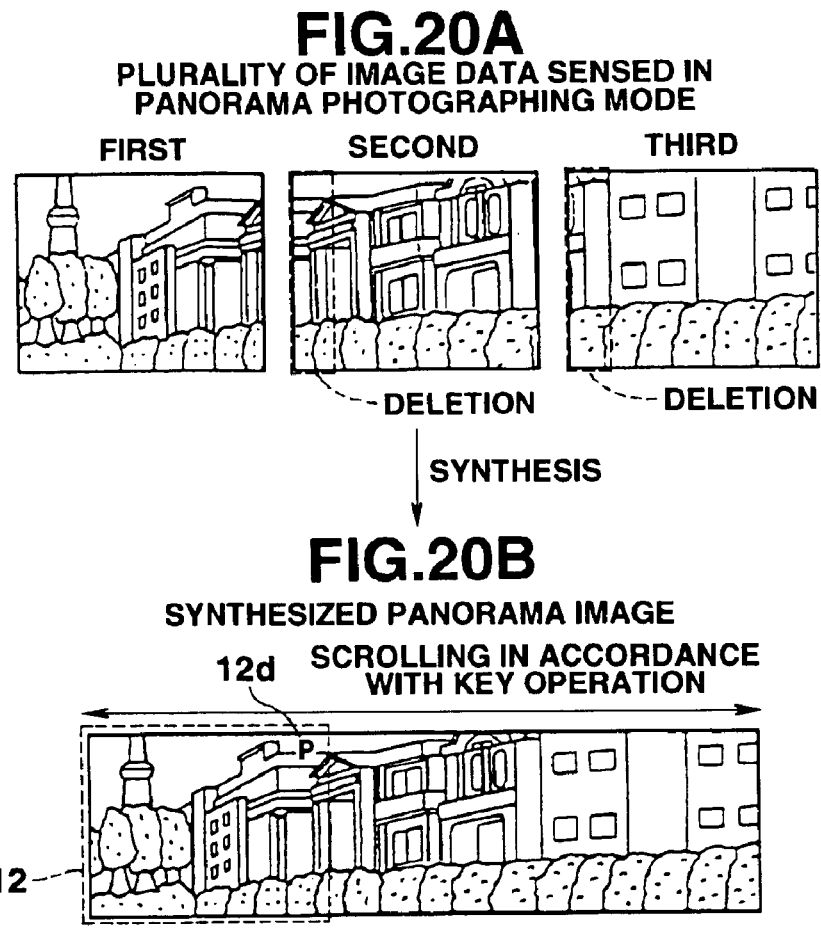
FIG.20B
SYNTHESIZED PANORAMA IMAGE
FIG.20C
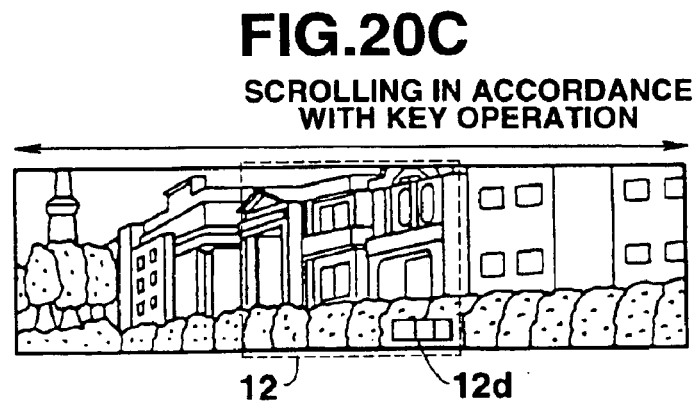
FIG.20D
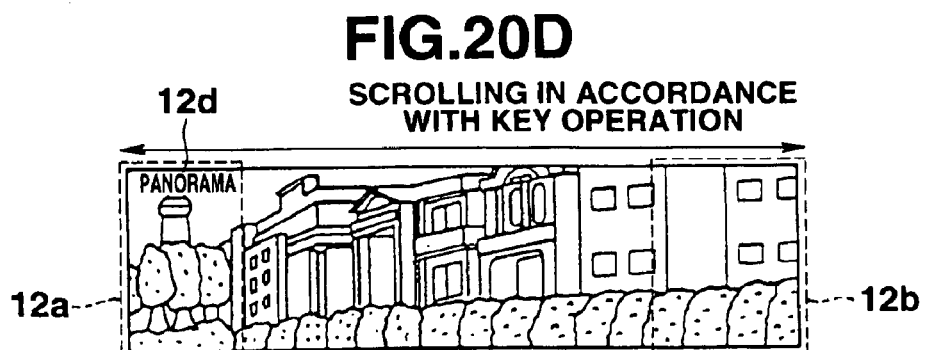

ELECTRONIC STILL CAMERA HAVING PHOTOGRAPHED IMAGE REPRODUCING FUNCTION

TECHNICAL FIELD

The present invention relates to an electronic still camera and image reproducing method. The present invention can be suitably applied to a digital camera having a panorama image photographing function, in particular. However, the present invention is not limited to this.

BACKGROUND ART

Digital cameras (electronic still cameras) designed to electronically store photographed images instead of recording them on films have recently become popular. In such a digital camera, when the photographer presses the shutter, an image of an object to be photographed which is received through the photographing lens is sensed by an image sensing element such as a CCD (Charge Coupled Device). The resultant data is subjected to data compression and the like and stored as image data in an internal memory.

Some digital cameras have panorama photographing functions of photographing landscape or portrait object images (panorama images) at angles wider than normal angle.

Assume that a picture is taken by using a panorama photographing function of the type that generates a panorama image by synthesizing a plurality of consecutively photographed images. In this case, when the plurality of images constituting the panorama image are reproduced/displayed one by one by the same method as that for the images photographed in the normal photographing mode, the respective images constituting the panorama image are separately displayed. That is, the panorama photographing function cannot be satisfactorily used.

Assume that a picture is taken by using a panorama photographing function of the above type or a panorama photographing function of the type that generates a panorama image by cutting the upper and lower or left and right portions of a photographed image at a predetermined ratio. In this case, if the panorama image is displayed at once, the upper and lower or left and right portions of the display unit inevitably become non-display portions. As a result, the panorama image is displayed in a considerably small size. In this case, the panorama photographing function cannot be satisfactorily used either.

DISCLOSURE OF INVENTION

The present invention has been made in consideration of these problems, and has as its object to provide an electronic still camera and an image reproducing method which can cause an image display unit to effectively display a photographed image having an aspect ratio different from that of the image display unit.

In order to achieve the above object, according to a preferred aspect, an electronic still camera comprises photographing means for acquiring image data having an aspect ratio different from that of an image display unit, and display control means for displaying the image data acquired by the photographing means on the image display unit. The display control means further comprises scrolling control means for, when the image data acquired by the photographing means is to be displayed on the image display unit, causing the image display unit to display partial image data of the image data, and also causing the image display unit to scroll the image data by consecutively changing/controlling the partial image data to be displayed by the image display unit. With this arrangement, the image display unit can effectively display an image having an aspect ratio different from that of the image display unit by optimally and effectively using the image display unit.

BRIEF DESCRIPTION OF DRAWINGS

FIGS. 10A, 10B, and 10C are views showing how a reproduced image display area 12b and a through screen area 12c are set on the display unit 12 (finder) in photographing for the second or subsequent image data in the panorama photographing mode when the photographing direction of a panorama image is set to the horizontal direction from the right to left, the vertical direction from the bottom to top, and the vertical direction from the top to bottom in the image sensing condition setting processing in FIG. 5;

FIGS. 20A, 20B, 20C, and 20D are views showing the panorama image synthesized by the reproduction display processing in FIGS. 12 through 19 and reproduced/displayed by the display unit 12;

BEST MODE OF CARRYING OUT THE INVENTION

A preferred embodiment of the present invention will be described in detail below with reference to the accompanying drawings.

Note that in the following embodiment, panorama images include a portrait image obtained by photographing an object at an angle wider than normal angle as well as a landscape image obtained by photographing an object at an angle wider than normal angle.

The configuration will be described first.

Figure 1:
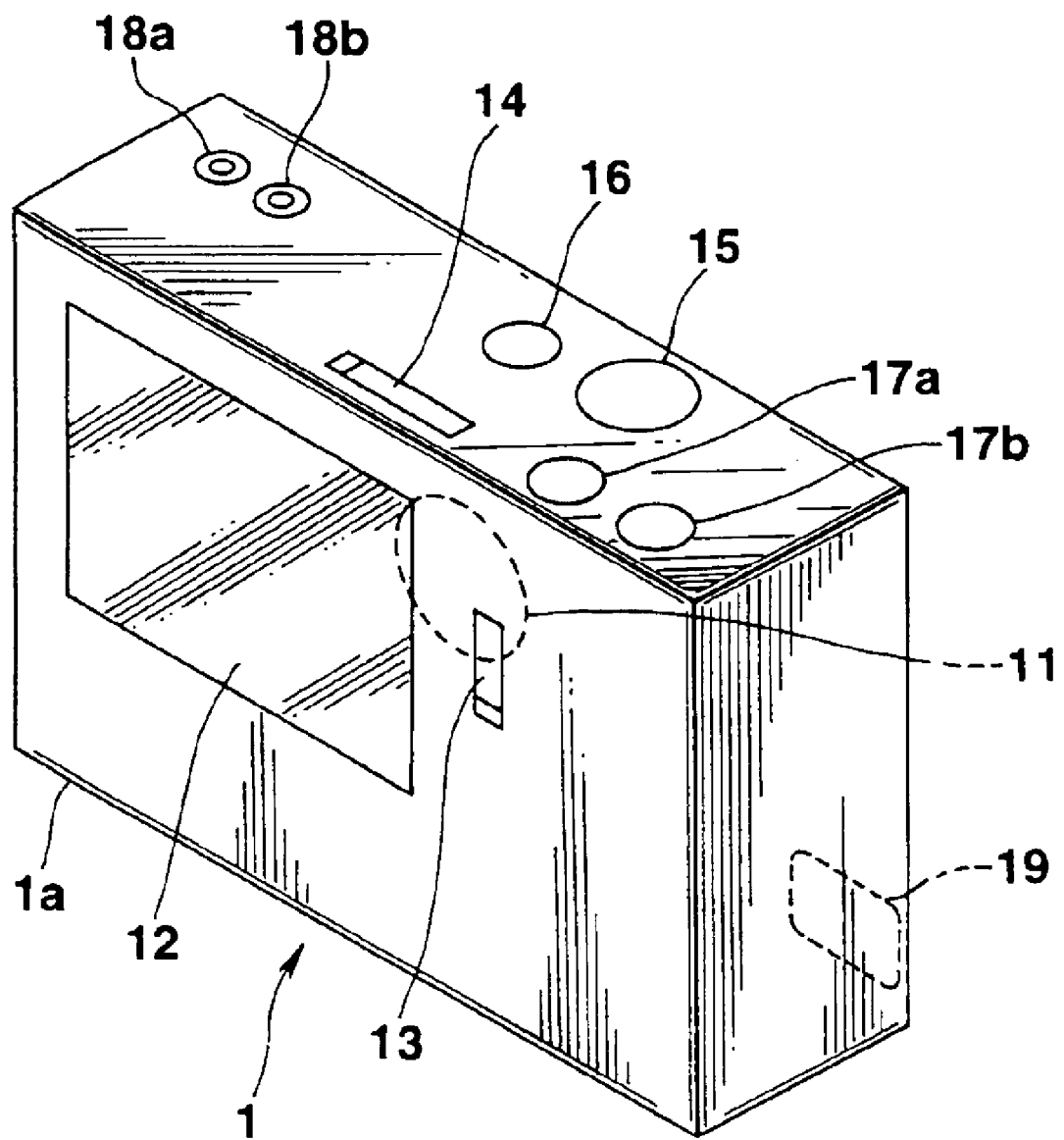
FIG. 1 is a perspective view showing the outer appearance of a digital camera 1 to which the present invention is applied.

FIG. 1 is a perspective view showing the outer appearance of a digital camera 1 (electronic still camera) to which the present invention is applied.

Referring to FIG. 1, an image sensing lens 11 (dashed line) is placed on the rear surface side of a body casing 1a. A display unit 12 composed of a liquid crystal display (LCD) and the like is placed on the front surface side of the body casing 1a in FIG. 1. In photographing operation, an object image received through the image sensing lens 11 can be displayed on the display unit 12 serving as a finder. In addition, after photographing operation, the sensed image can be reproduced and displayed on the display unit 12. A mode switch 13 is placed on the right side of the display unit 12. The mode switch 13 is slid vertically to designate switching of photographing modes (normal photographing mode and panorama photographing mode), a reproduction mode, and a communication mode.

A power switch 14, a shutter key 15, an effect key 16, and "+" and "−" keys 17a and 17b are placed on the upper surface side of the body casing 1a in FIG. 1. The power switch 14 is slid horizontally to designate power ON/OFF switching. The shutter key 15 is used to designate image sensing and determination of contents selected in the respective modes. The effect key 16 is used to designate the cancellation of contents selected in the respective modes. The "+" and "−" keys 17a and 17b are used to select/designate image data to be reproduced/displayed on the display unit 12 from a plurality of image data stored in a memory (flash memory 31 to be described later) and select conditions to be set in the respective modes.

A serial input/output terminal 18a and a video output terminal 18b are placed on the upper surface side of the body casing 1a in FIG. 1. The serial input/output terminal 18a is used to transmit/receive image data, control data, and the like to/from an external device through a communication cable (not shown). The video output terminal 18b is used to output, to an external device, a video signal identical to a video signal (display data) to the display unit 12. A communication cable such as an RS-232C (serial) cable can be connected to the serial input/output terminal 18a. An infrared communication window 19 (dashed line) through which image data, control data, and the like are transmitted/received to/from an external device by infrared signals is formed on the rear surface side of the body casing 1a in FIG. 1.

The digital camera 1 may be composed of a camera portion including the image sensing lens 11 and a main body portion. The camera portion may be rotatably and detachably mounted on the main body portion to allow the image sensing lens 11 to variously rotate and move with respect to the main body.

Figure 2:
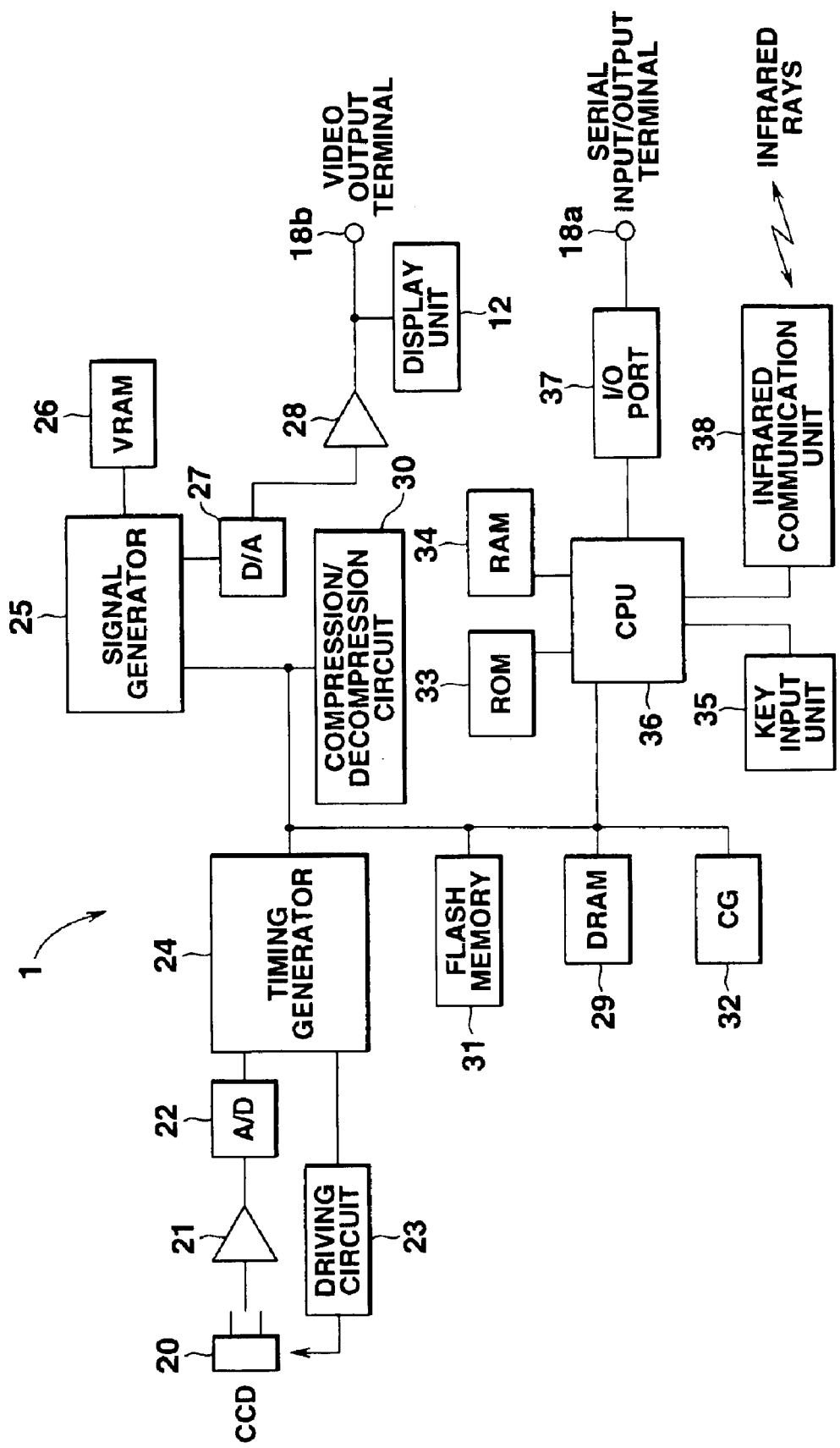
FIG. 2 is a block diagram showing the circuit arrangement of the digital camera 1 in FIG. 1.

FIG. 2 is a block diagram showing the circuit arrangement of the digital camera 1 in FIG. 1.

Referring to FIG. 2, the digital camera 1 comprises the display unit 12 in FIG. 1, a CCD 20, an amplifier 21, an A/D converter 22, a driving circuit 23, a timing generator 24, a signal generator 25, a VRAM 26, a D/A converter 27, an amplifier 28, a DRAM 29, a compression/decompression circuit 30, the flash memory 31, a CG 32, a ROM 33, a RAM 34, a key input unit 35, a CPU 36, an I/O port 37, and an infrared communication unit 38.

The CCD (Charge Coupled Device) 20 is composed of a pixel surface on which many elements (pixels), each formed by stacking a transfer electrode on a light-receiving portion such as a photodiode, are arranged two-dimensionally, and an output portion for converting the charge stored in each pixel into a voltage and outputting it. Light coming through the image sensing lens 11 is received by the pixel surface, and a charge proportional to the amount of light received is stored in each pixel. The charges stored in the respective pixels are sequentially read out as an image sensing signal (analog signal) from the output portion in units of pixels in accordance with a driving signal supplied from the driving circuit 23. The signal is then output to the A/D converter 22 through the amplifier 21.

The A/D (Analog to Digital) converter 22 converts the image sensing signal, input from the CCD 20 through the amplifier 21, from an analog signal to a digital signal, and supplies it to the timing generator 24.

The driving circuit 23 controls the exposure and read timings of the CCD 20 on the basis of the timing signal supplied from the timing generator 24. The timing generator 24 generates a timing signal for controlling the driving circuit 23 on the basis of a video capture signal input from the CPU 36.

The signal generator 25 performs color computation processing for the image sensing signal (digital signal) supplied through the timing generator 24 to generate image data made up of a luminance signal (Y data) and a color signal (C data), and outputs the image data to the DRAM 29.

The signal generator 25 generates a video signal (digital signal) by, for example, adding a sync signal to the image data supplied from the DRAM 29 by the CPU 36, and temporarily stores it in the VRAM 26. Thereafter, the video signal stored in the VRAM 26 is output to the display unit 12 through the D/A converter 27 and the amplifier 28. If an external device is connected to the video output terminal 18b through a video cable, this video signal is also output to the external device.

In this signal generator 25, display control processing similar to that for the above normal image data is also performed for panorama image data generated by synthesizing a plurality of sensed image data in reproduction display processing (see FIGS. 12 through 19) and communication processing (see FIGS. 21 and 22) to be described later. That is, the signal generator 25 generates a video signal (digital signal) by, for example, adding a sync signal to the panorama image data supplied from the DRAM 29 by the CPU 36, and stores it in the VRAM 26. The signal generator 25 then reads out a 1-frame video signal from the VRAM 26, and outputs the signal to the display unit 12 through the D/A converter 27 and the amplifier 28.

The VRAM (Video Random Access Memory) 26 is a video memory for temporarily storing the video signal (display data) generated by the signal generator 25, and has a memory capacity enough to store the above panorama image data.

The D/A (Digital to Analog) converter 27 converts the video signal (display data), supplied from the VRAM 26 by the signal generator 25, from a digital signal to an analog signal, and outputs it to the display unit 12 through the amplifier 28. If an external device is connected to the video output terminal 18b through the video cable, the D/A converter 27 also outputs this signal to the external device.

The display unit 12 is composed of a liquid crystal display and the like and serves to display an image on the display screen on the basis of the video signal (display data) input through the D/A converter 27 and the amplifier 28. In photographing operation, an object image received through the image sensing lens 11 can be displayed on the display unit 12 serving as a finder. In addition, after photographing operation, the sensed image data stored in the flash memory 31 can be reproduced and displayed on the display unit 12.

Note that the display screen and image display area of the display unit 12 need not coincide with each other. For example, the display screen may be composed of an image display area and a function display area. In addition, a reproduced image display area 12b and a through screen area 12c (see FIG. BB) are set on the display unit 12. When a plurality of image data for a panorama image are to be obtained by photographing operation in panorama image sensing processing (see FIG. 7), the reproduced image display area 12b is used to reproduce/display an image of an end portion of the sensed image that is obtained immediately before the second or subsequent image data is to be obtained by photographing operation. The through screen area 12c is used as a finder to display an image of the object to be photographed.

The DRAM (Dynamic Random Access Memory) 29 is a semiconductor memory for temporarily storing the sensed image data supplied from the signal generator 25 or the image data read out from the flash memory 31 by the CPU 36 and decompressed by the compression/decompression circuit 30. The DRAM 29 is also used as a work area for synthesizing panorama image data on the basis of a plurality of sensed image data in reproduction display processing (see FIGS. 12 through 19) and communication processing (see FIGS. 21 and 22).

The compression/decompression circuit 30 compresses the image data stored in the DRAM 29 by encoding. More specifically, the compression/decompression circuit 30 compresses (encodes) the image data by a predetermined encoding scheme, i.e., a scheme corresponding to the type of image processed (still image in this case), e.g., DCT (Discrete Cosine Transform) in units of 8×8 pixels in accordance with the JPEG (Joint Photographic Experts Groups) algorithm, quantization, and Huffman encoding and outputs the compressed image data to the flash memory 31. The compression/decompression circuit 30 decodes and decompresses the compressed image data stored in the flash memory 31, and outputs it to the DRAM 29.

Figure 21:
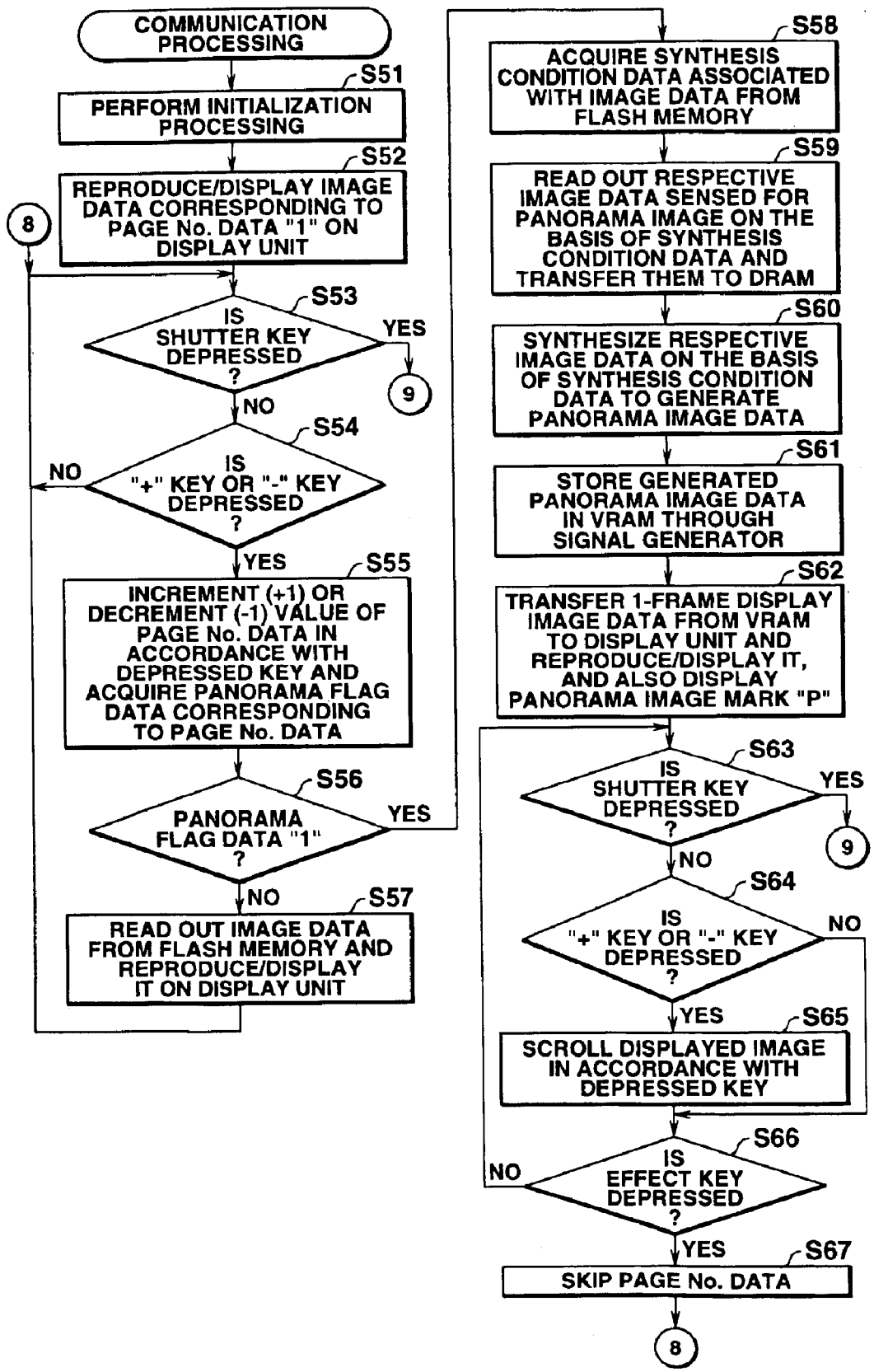
FIG. 21 is a flow chart (first flow chart) showing the communication processing executed by the CPU 36 in FIG. 2.
Figure 22:
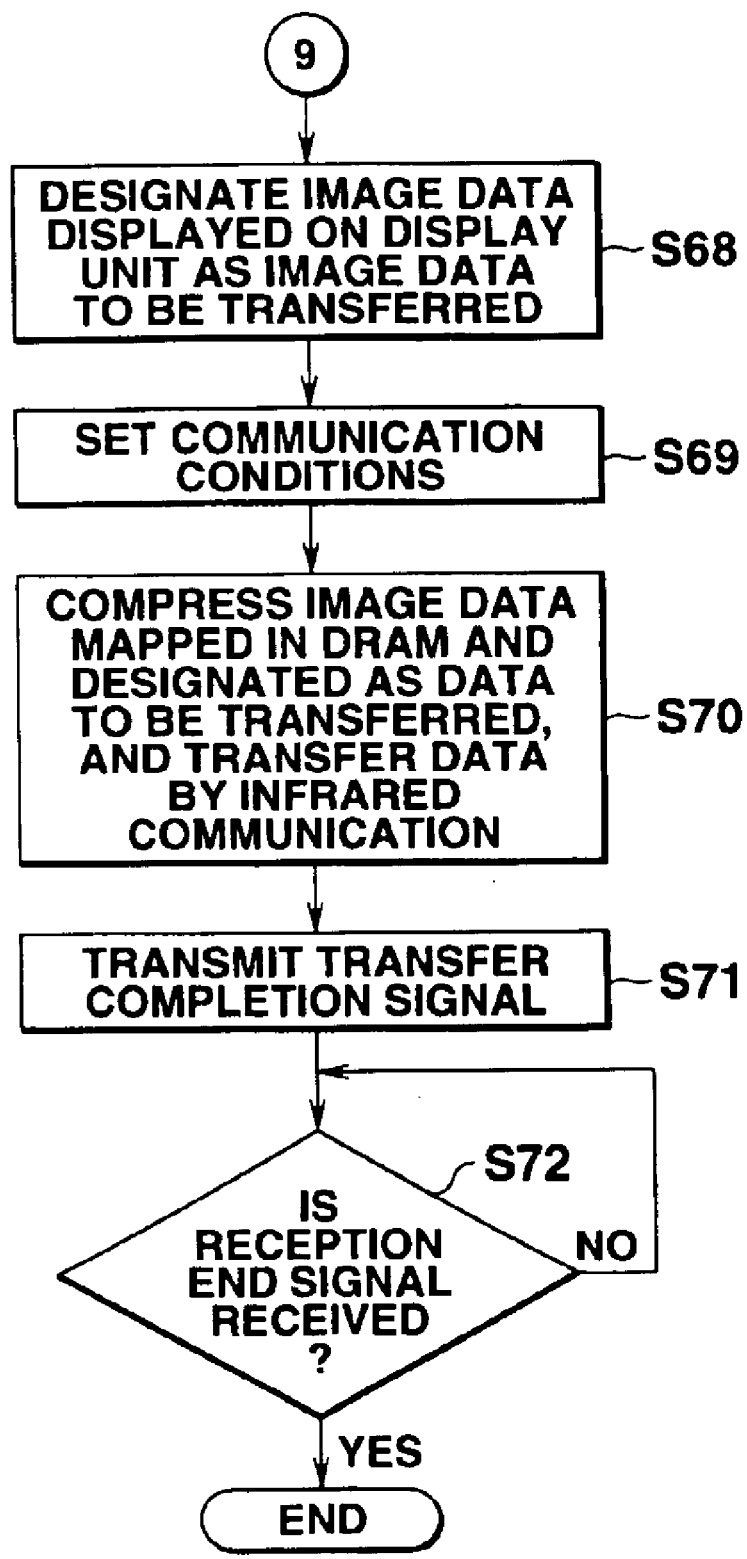
FIG. 22 is a flow chart (second flow chart) showing the communication processing executed by the CPU 36 in FIG. 2.

The compression/decompression circuit 30 also compresses panoramic image data by the above encoding scheme when the panorama image data is to be transferred to an external device in communication processing to be described later (see FIGS. 21 and 22).

The flash memory 31 is a semiconductor memory for storing a plurality of image data compressed by the compression/decompression circuit 30.

Figure 3:
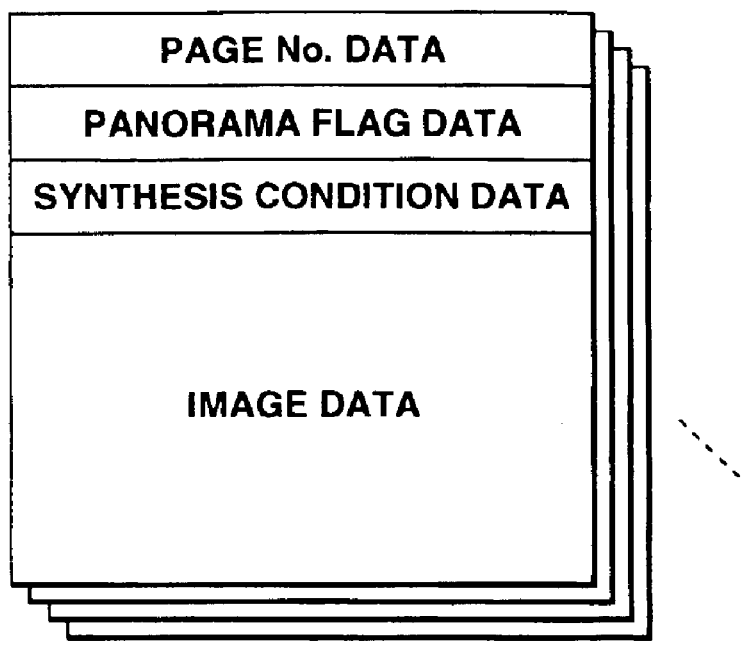
FIG. 3 is a view showing the memory configuration of a flash memory 31 in FIG. 2.
Figure 4:
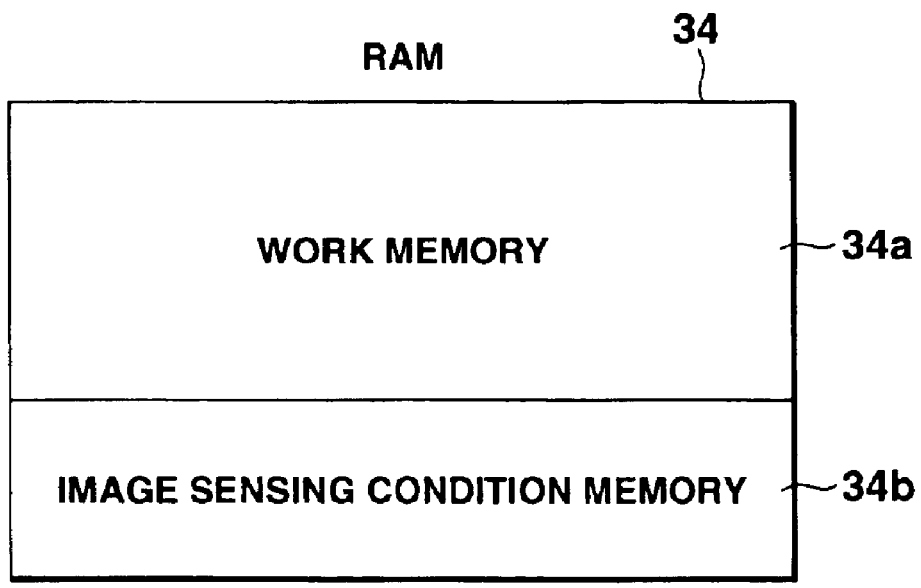
FIG. 4 is a view showing the memory configuration of a RAM 34 in FIG. 2.

FIG. 3 shows the memory configuration of the flash memory 31. As shown in FIG. 3, the flash memory 31 stores image data in correspondence with page No. data, panorama flag data, and synthesis condition data.

The page No. data is numerical data indicating serial numbers assigned to the image data in the order in which they are stored in the flash memory 31. For example, page No. data "1" is assigned to the image data stored first in the flash memory 31, and page No. data "2" is assigned to the image data stored next.

As the panorama flag data, "1" is stored if the corresponding image data is one of a plurality of image data sensed for a panorama image. Otherwise, i.e., if the corresponding image data is normal sensed image data, "0" is stored.

The synthesis condition data is data to be stored if the panorama flag data is "1". This data describes synthesis conditions under which a plurality of image data sensed for a panorama image are synthesized into panorama image data in reproduction display processing (see FIGS. 12 through 19) and communication processing (see FIGS. 21 and 22) to be described later.

This synthesis condition data is made up of joint picture count data, photographing direction data, and image sensing order data, and is written in a data format like "3R-1".

The joint picture count data is the first-digit numerical data in the data format of the synthesis condition data. This data indicates the number of sensed images forming this panorama image.

The photographing direction data is the second-digit data of the data format. This data indicates the photographing direction of a plurality of image data which are independently obtained by consecutively photographing an object at a wide angle in a predetermined direction in the panorama photographing mode. This photographing direction data is set in photograph condition setting processing to be described later (see FIG. 5). When the respective image data are consecutively sensed from the left to right in the horizontal direction, "R" (Right) is set. When the respective image data are consecutively sensed from the right to left in the horizontal direction, "L" (Left) is set. When the respective image data are consecutively sensed upward in the vertical direction, "U" (Up) is set. When the respective image data are consecutively sensed downward in the vertical direction, "D" (Down) is set.

The image sensing order data is the fourth-digit numerical data following "−" (hyphen) of the above data format. This data indicates the image sensing order of the respective image data sensed for a panorama image.

The data format example "3R-1" of the synthesis condition data therefore indicates that this panorama image is composed of three sensed images, the three sensed images are consecutively sensed from the left to right in the horizontal direction, and the sensed image corresponding to this synthesis condition data is the first image that was sensed.

The CG (Character Generator) 32 is a memory for storing character data to be displayed on the display unit 12, e.g., kana data, kanji data, alphanumeric data, and symbol data for operation guidance.

The ROM (Read Only Memory) 33 is used to store various control programs for controlling the respective portions of the digital camera 1, which are executed by the CPU 36, in image sensing condition setting processing (see FIG. 5), panorama image sensing processing (see FIG. 7), reproduction display processing (see FIGS. 12 through 19), communication processing (FIGS. 21 and 22), and the like which will be described later. These control programs are stored as program codes that can be read by the CPU 36.

The RAM (Random Access Memory) 34 is made up of a work memory 34a in which programs for controlling various types of control processes are mapped when they are executed by the CPU 36 or various data to be processed are temporarily stored, and an image sensing condition memory 34b for storing various image sensing condition data (e.g., shutter speed, aperture, and the photographing direction of a panorama image) set by image sensing condition setting processing (see FIG. 5) to be described later.

The image sensing condition memory 34b is a nonvolatile memory such as an EEPROM (Electrical Erasable Programmable ROM), and hence can retain the stored contents after the power is turned off.

The key input unit 35 is made up of the mode switch 13, the power switch 14, the shutter key 15, the effect key 16, and the "+" and "−" keys 17a and 17b. The key input unit 35 outputs various operation signals corresponding to the pressing and sliding operations of the respective keys to the CPU 36.

The CPU (Central Processing Unit) 36 is a central processing unit for controlling the respective portions of the digital camera 1 in accordance with the various control programs stored in the ROM 33. More specifically, when the mode switch 13 is slid to designate the panorama photographing mode, the CPU 36 executes panorama image sensing processing (see FIG. 7) to be described later.

In this panorama image sensing processing, when the second and subsequent image data are to be sensed, the CPU 36 sets the reproduced image display area 12b for reproducing/displaying a portion of the previously sensed image data in the display unit 12 serving as a finder, and reproduces/displays a portion of the previously sensed image data, stored in the flash memory 31, in the reproduced image display area 12b. In addition, the CPU 36 sets the remaining area of the display unit 12 as the through screen area 12c, and displays an image of the sensed object in the through screen area 12c.

In this case, the CPU 36 controls the position of the reproduced image display area 12b to be set in the display unit 12 on the basis of the photographing direction set in image sensing condition setting processing (see FIG. 5) to be described later. The CPU 36 also controls the image area of the previously sensed image data to be reproduced/displayed in the reproduced image display area 12b on the basis of the set photographing direction.

The CPU 36 executes image sensing processing upon depression of the shutter key 15, and outputs a video capture signal to the timing generator 24. The timing generator 24 generates a timing signal and outputs it to the driving circuit 23 on the basis of the video capture signal. The driving circuit 23 controls the exposure and read timings of the CCD 20 on the basis of the timing signal. The A/D converter 22 converts the received image sensing signal from an analog signal to a digital signal. The signal generator 25 performs color computation processing for the image sensing signal to generate image data, and stores it in the DRAM 29. The CPU 36 transfers the image data stored in the DRAM 29 to the compression/decompression circuit 30 to make the circuit compress the data. The CPU 36 then stores this compressed image data in the flash memory 31 in correspondence with new page No. data, new panorama flag data (=1), and new synthesis condition data.

The CPU 36 also executes reproduction display processing (see FIGS. 12 and 18) to be described later when the reproduction mode is designated upon sliding operation of the mode switch 13.

In this reproduction display processing, the CPU 36 designates image data to be reproduced/displayed from the image data stored in the flash memory 31 in the page No. order in accordance with depression of the "+" key 17a or the "−" key 17b (in ascending order when the "+" key 17a is depressed; in descending order when the "−" key 17b is depressed). The CPU 36 checks whether the designated image data are image data sensed in the panorama photographing mode. If they are image data sensed in the panorama photographing mode (panorama flag data=1), the CPU 36 sequentially reads out this image data and the respective image data consecutively sensed in the panorama photographing mode from the flash memory 31, and transfers the image data to the compression/decompression circuit 30 to make it decompress the data. The CPU 36 then stores the data in the DRAM 29.

The CPU 36 synthesizes the image data stored in the DRAM 29 on the basis of the synthesis condition data to generate panorama image data of a wide-angle image of the object, and transfers the panorama image data to the signal generator 25. The signal generator generates a video signal (display data) by, for example, adding a sync signal to the input panorama image data, and temporarily stores the data in the VRAM 26. The signal generator 25 then reads out 1-frame image data from the VRAM 26 and outputs the data to the display unit 12 through the D/A converter 27 and the amplifier 28, thereby reproducing/displaying a portion of the panorama image on the display screen.

When this panorama image is reproduced/displayed, the CPU 36 displays, on the display screen, a panorama image mark 12d "P" indicating that the displayed image is a panorama image. In addition, the CPU 36 sends a scrolling direction signal to the signal generator 25 in accordance with depression of the "+" key 17a or the "−" key 17b. The signal generator 25 continuously changes/controls the 1-frame image data read out from the VRAM 26 in accordance with this scrolling direction control signal so as to scroll the panorama image on the display unit 12 in accordance with depression of the "+" key 17a or the "−" key 17b.

When the mode switch 13 is slid to designate the communication mode, the CPU 36 executes communication processing (see FIGS. 14 and 15) to be described later.

In this communication processing, the CPU 36 reproduces/displays the image data (normal sensed image data or panorama image data) stored in the flash memory 31 on the display unit 12 in accordance with depression of the "+" key 17a or the "−" key 17b in the same manner as in the above reproduction display processing. Upon depression of the shutter key 15, the CPU 36 designates the image data currently reproduced/displayed on the display unit 12 as image data to be transferred to an external device, and transfers the image data (normal sensed image data or panorama image data obtained by image synthesis) mapped in the DRAM 29 for reproduction/display to the compression/decompression circuit 30. Upon making the compression/decompression circuit 30 compress the data, the CPU 36 outputs the image data to the infrared communication unit 38. The CPU 36 then transfers the image data from the infrared communication unit 38 to the external device as a destination by using infrared pulses.

The I/O (Input/Output) port 37 is an interface for performing input/output control on serial data (image data, control data, and the like) to be exchanged between the digital camera 1 and the external device connected thereto through the serial input/output terminal 18a and a communication cable.

The infrared communication unit 38 is an infrared interface for performing infrared communication based on the IrDA (Infrared Data Association) scheme between the digital camera 1 and the external device, and performs transmission/reception control on image data, control data, and the like to be exchanged by infrared communication.

More specifically, the infrared communication unit 38 is constituted by a transmission data memory for temporarily storing transmission data to be transmitted to an external device having an infrared communication function, a modulating section for modulating the data stored in the transmission data memory into an infrared signal, a transmission LED for transmitting the modulated Ir signal to the external device through the infrared communication window 19 by using infrared pulses, a photodiode for receiving, through the infrared communication window 19, the infrared signal transmitted from the external device by using infrared pulses, a demodulating section for demodulating the received infrared signal into reception data, and a reception data memory for temporarily storing the demodulated reception data.

The digital camera 1 has the above arrangement.

Its operation will be described next.

Figure 5:
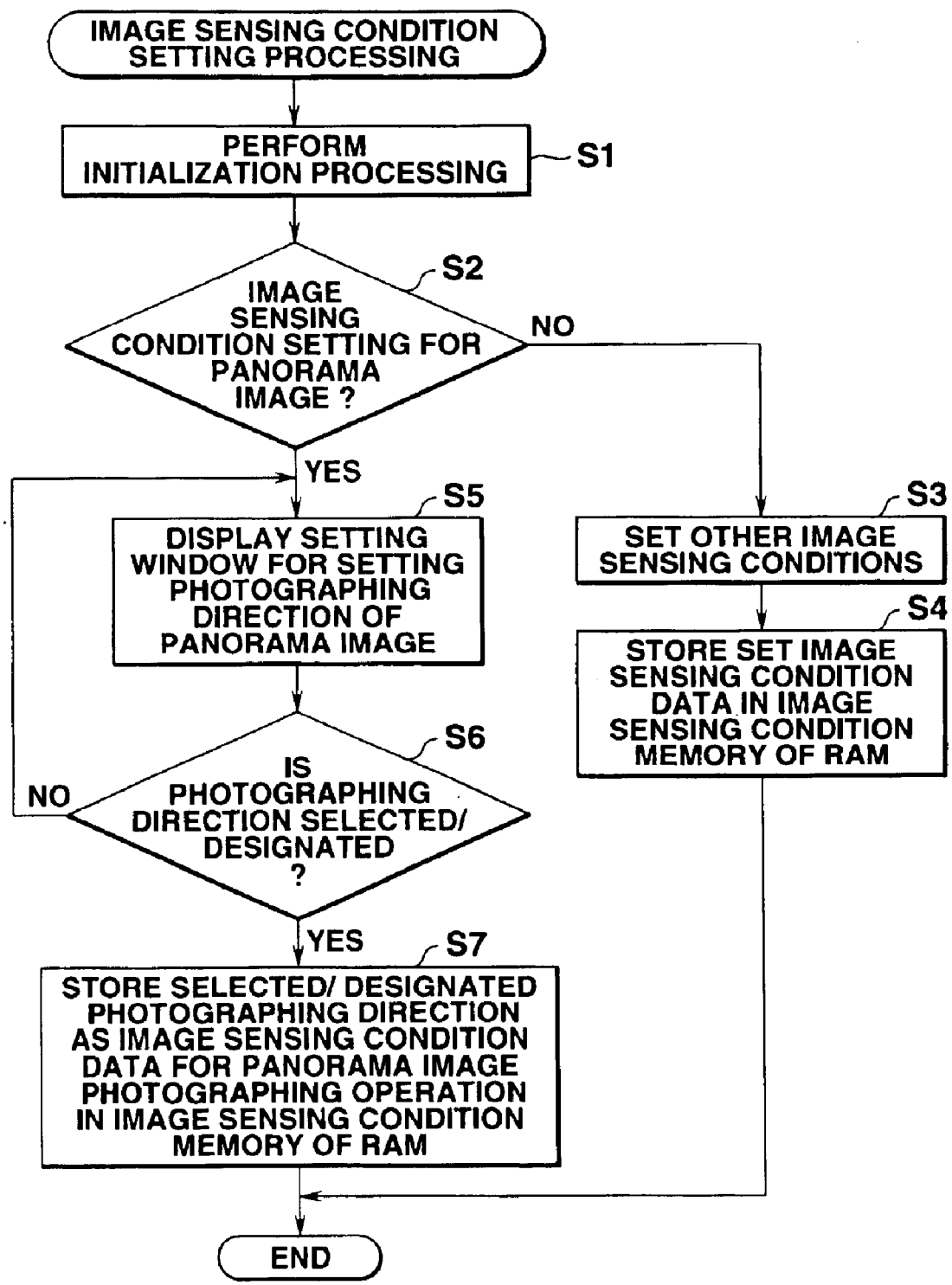
FIG. 5 is a flow chart showing the image sensing condition setting processing executed by the CPU 36 in FIG. 2.
Figure 6A:
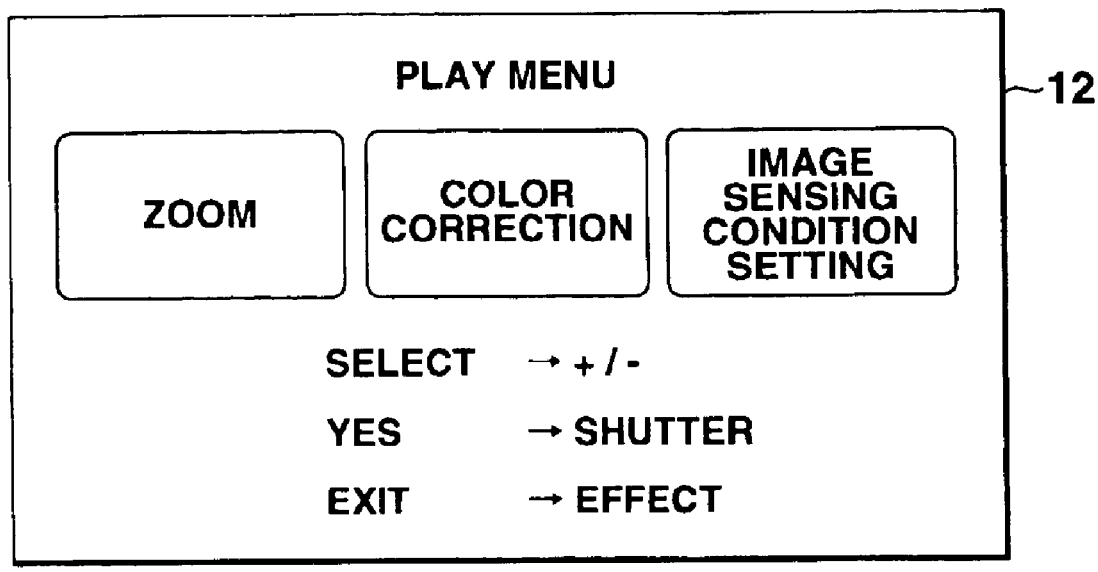
FIGS. 6A and 6B are views showing display samples on the screen in the image sensing condition setting processing in FIG. 5.
Figure 6B:
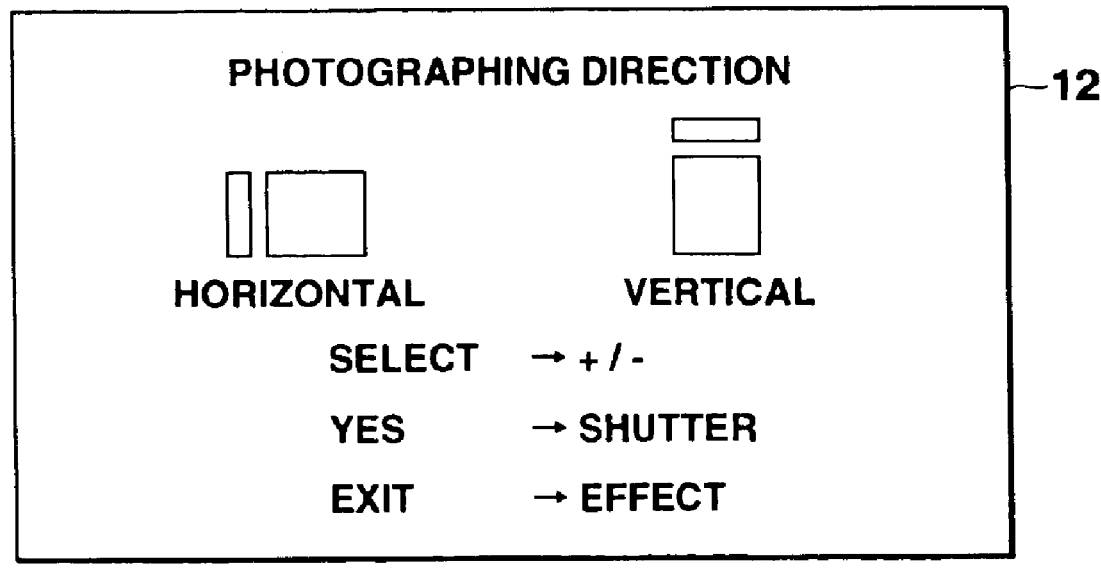

Image sensing condition setting processing executed by the CPU 36 of the digital camera 1 sill be described first with reference to the flow chart of FIG. 5 and the display samples shown in FIGS. 6A and 6B.

When the mode switch 13 is slid to designate the reproduction mode, and the effect key 16 is depressed, the CPU 36 displays a menu describing various processes (e.g., zooming processing, color correction processing, and image sensing condition setting processing) on the display unit 12, as shown in FIG. 6A. When image sensing condition setting processing of these processes is selected/designated, the CPU 36 reads out the program associated with the image sensing condition setting processing from the ROM 33, and starts the processing.

First of all, the CPU 36 performs initialization processing such as initialization (step S1) first, and then checks on the basis of key operation whether the image sensing condition setting processing for a panorama image is to be performed (step S2).

Upon determining that the image sensing condition setting processing for a panorama is not to be performed, the CPU 36 determines that another type of image sensing condition setting processing is to be performed. For example, the CPU 36 performs image sensing condition setting processing such as changing/setting the shutter speed to adjust the exposure time of the CCD 20 or changing/setting the aperture to adjust the amount of light received through the image sensing lens 11 so as to adjust the brightness of the sensed image (step S3). The set image sensing condition data is stored in the image sensing condition memory 34b of the RAM 34 (step S4), and the image sensing condition setting processing is terminated.

If the CPU 36 determines in step S2 that the image sensing condition setting processing for a panorama image is to be performed, the CPU 36 displays, on the display unit 12, a setting window for setting the photographing direction of a panorama image, as shown in FIG. 6B (step S5).

Referring to FIG. 6B, "HORIZONTAL" is a condition for sensing a plurality of images from the left to right in the horizontal direction in the panorama photographing mode, and "VERTICAL" is a condition for sensing a plurality of images downward in the vertical direction in the panorama photographing mode.

The CPU 36 checks whether the photographing direction of a panorama image is selected/designated upon depression of the "+" key 17a, the "−" key 17b, the shutter key 15, and the like (step S6). If the photographing direction of the panorama image is not selected/designated, the flow returns to step S5.

When the CPU 36 determines that the photographing direction of the panorama image is selected/designated, the CPU 36 stores the data of the selected/designated photographing direction as image sensing condition data in the image sensing condition memory 34b of the RAM 34 (step S7). This image sensing condition setting processing is then-terminated.

The above description concerns the sequence of image sensing condition setting processing executed by the CPU 36 of the digital camera 1.

In the above image sensing condition setting processing, control allows either the horizontal direction from the left to right ("HORIZONTAL") or the vertical direction from the top to bottom ("VERTICAL") to be set as a photographing direction in panorama image photographing operation. Obviously, however, control may allow the horizontal direction from the right to left and the vertical direction from the bottom to top to be also set.

Figure 7:
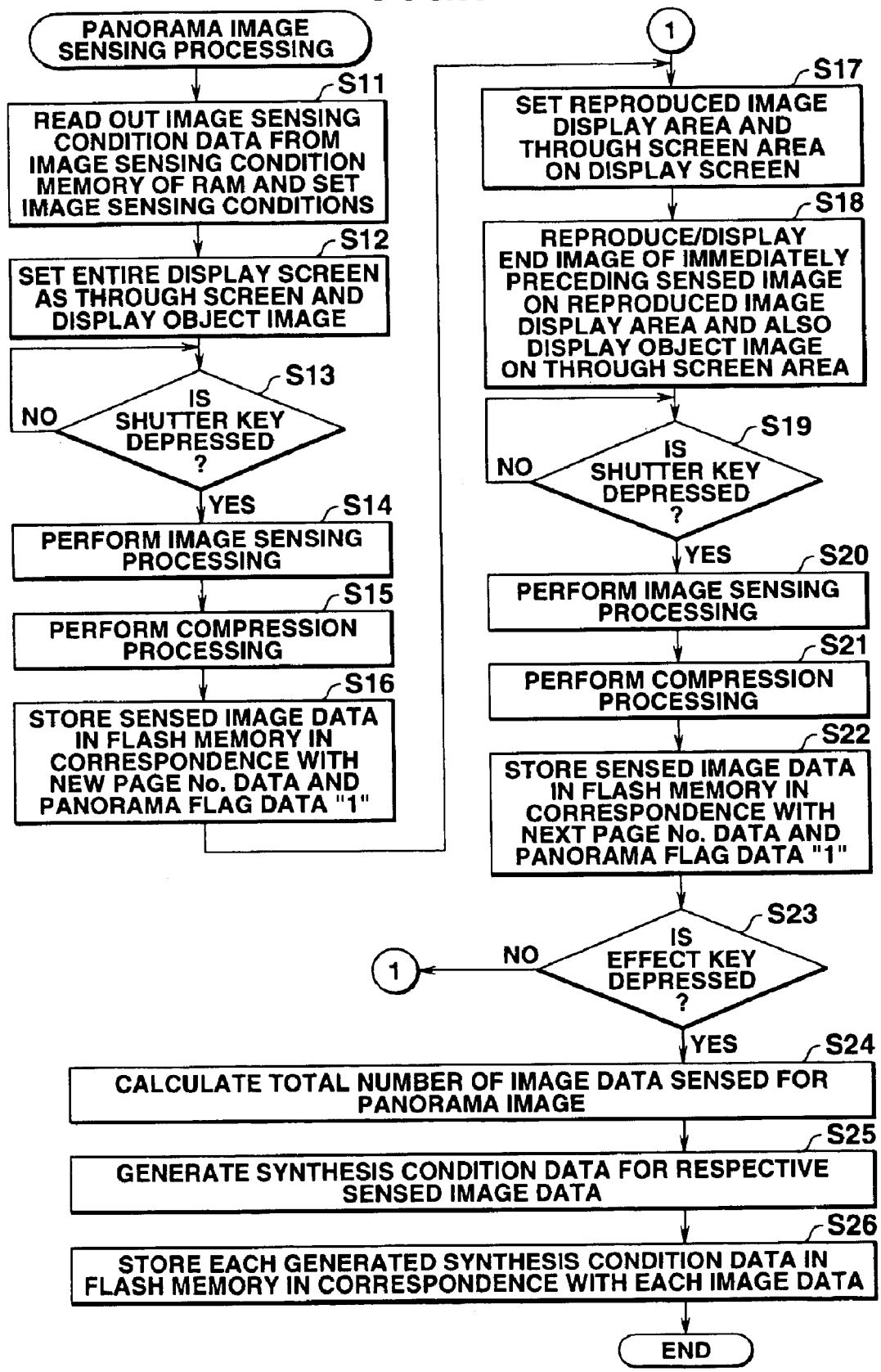
FIG. 7 is a flow chart showing the panorama image sensing processing executed by the CPU 36 in FIG. 2.

The panorama image sensing processing executed by the CPU 36 of the digital camera 1 will be described next with reference to the flow chart of FIG. 7 and the display samples shown in FIGS. 8A and 8B and FIGS. 9A through 9D. In this panorama image sensing processing, a plurality of image data for a panorama image are sensed and stored.

For the sake of convenience, assume that in the following panorama image sensing processing, the horizontal direction from the left to right ("HORIZONTAL") is set as the photographing direction of the panorama image by the above image sensing condition setting processing, and a plurality of image data for the panorama image are consecutively sensed in the horizontal direction from the left to right.

When the mode switch 13 is slid to designate the panorama photographing mode, the CPU 36 reads out the program associated with the panorama image sensing processing from the ROM 33, and starts the processing.

First of all, the CPU 36 reads out the image sensing condition data stored in the image sensing condition memory 34b of the RAM 34 by the above image sensing condition setting processing, and sets image sensing conditions such as shutter speed, aperture, and the photographing direction of the panorama image on the basis of the image sensing condition data (step S11).

Figure 8A:
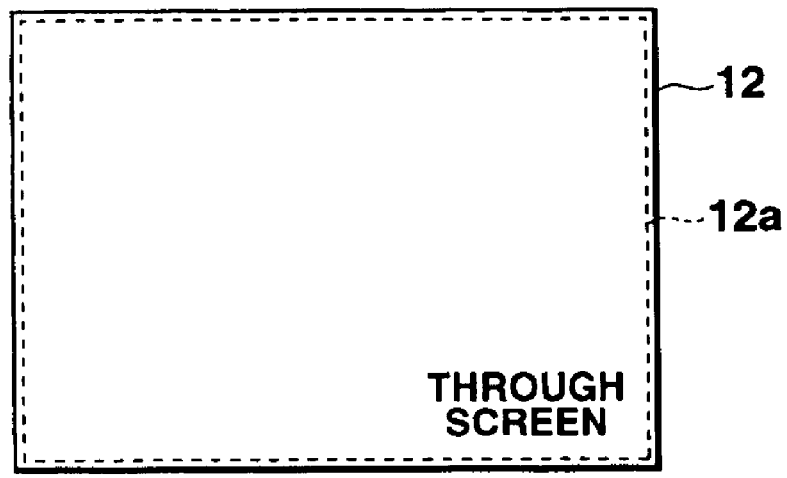
FIGS. 8A and 8B are views (first views) for explaining display control on a display unit 12 serving as a finder in the panorama image sensing processing in FIG. 7.

The CPU 36 performs display control on the display unit 12 as a finder. When the first image is photographed, the CPU 36 sets the entire area of the display screen as a through screen 12a, as shown in FIG. 8A, and displays the object image received through the image sensing lens 11 on the through screen 12a (step S12).

The CPU 36 checks whether the shutter key 15 is depressed (step S13). If the shutter key 15 is not depressed, the CPU 36 keeps checking whether the shutter key 15 is depressed. If the CPU 36 determines that the shutter key 15 is depressed, the CPU 36 executes image sensing processing for the first image (step S14).

The CPU 36 outputs a video capture signal to the timing generator 24. The timing generator 24 generates a timing signal and outputs it to the driving circuit 23 on the basis of the video capture signal. The driving circuit 23 controls the exposure and read timings of the CCD 20 on the basis of the timing signal to make the CCD 20 receive the image sensing signal. The A/D converter 22 converts the received image sensing signal from an analog signal to a digital signal. The signal generator 25 performs color computation processing for the image sensing operation to generate the first sensed image data, and stores it in the DRAM 29.

Subsequently, the CPU 36 transfers the sensed image data, stored in the DRAM 29, to the compression/decompression circuit 30, and make it compress the data (step 515). The CPU 36 then stores the compressed image data in the flash memory 31 in correspondence with new page No. data and the panorama flag data "1" (step S16).

The CPU 36 starts image sensing processing for the second and subsequent image data. First of all, the CPU 36 performs display control on the display unit 12 serving as a finder. In photographing the second and subsequent images, the CPU 36 sets the strip reproduced image display area 12b on the left end portion of the display screen, and also sets the remaining screen area as the through screen area 12c, as shown in FIG. BB (step S17).

The CPU 36 reproduces/displays an image of the right end portion of the sensed image immediately preceding the current sensed image in the reproduced image display area 12b, and also displays the object image received through the image sensing lens 11 in the through screen area 12c (step S18).

Display control on the display unit 12 in steps S17 and S18 will be described in detail with reference to FIGS. 9A through 9C.

Figure 8B:
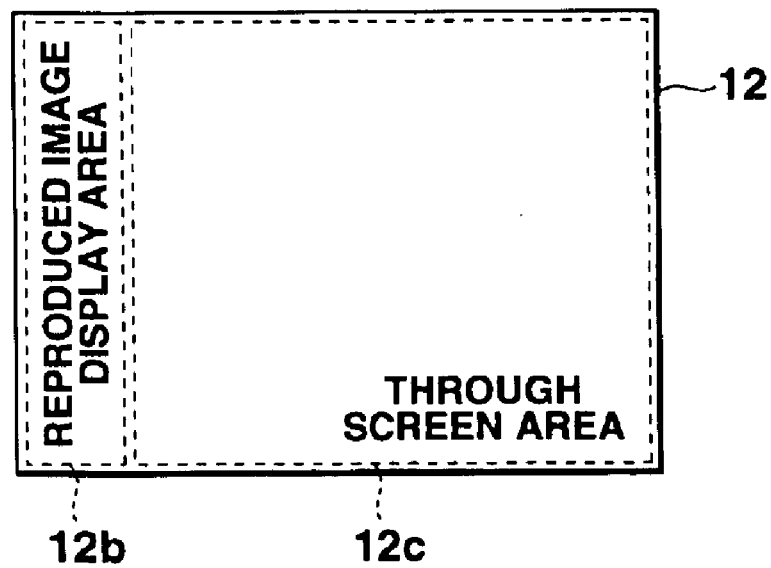
Figure 9A:
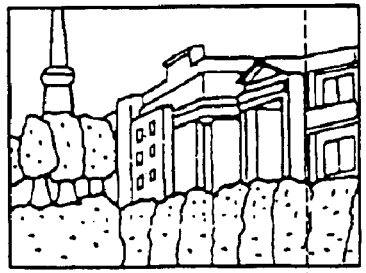
FIGS. 9A, 9B, 9C, and 9D are views (second views) for explaining display control on the display unit 12 serving as a finder in the panorama image sensing processing in FIG. 7.
Figure 9B:
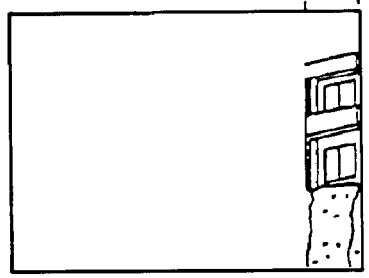

FIG. 9A shows the first sensed image data, which is sensed and stored in the flash memory 31 by the processing in steps S11 through S16. In photographing the second image, the CPU 36 sets the reproduced image display area 12b and the through screen area 12c on the display screen, as shown in FIG. 8B (step S17). In this case, first of all, the CPU 36 reads out the first sensed image data from the flash memory 31 and maps it in the DRAM 29, and acquires an image of the right end portion of the sensed image data (corresponding to the area size of the reproduced image display area 12b), as shown in FIG. 9B.

Figure 9C:
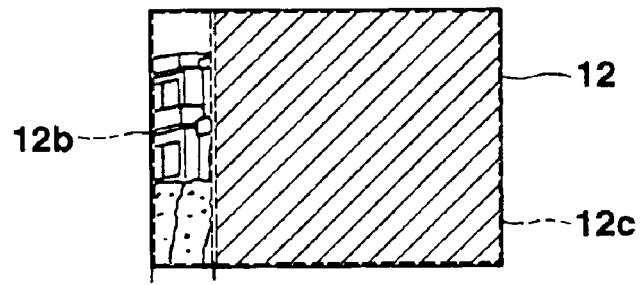

As shown in FIG. 9C, the CPU 36 reproduces/displays the acquired image in the reproduced image display area 12b on the display screen, and also displays the object image received through the image sensing lens 11 in the through screen area 12c (hatched portion) (step S18).

Figure 9D:
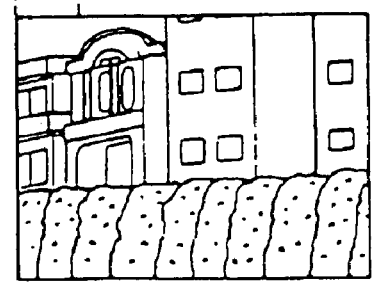

With this display control for the finder, when the second or subsequent image data is to be obtained by photographing in the panorama photographing mode, the user can sense the object image displayed in the through screen area 12c with its image position being matched with the end portion image of the sensed image immediately preceding the object image and reproduced/displayed in the reproduced image display area 12b of the display unit 12 (finder) (see FIG. 9D). Therefore, a plurality of image data to be sensed for a panorama image can be sensed very easily while any shifts between the image data are minimized.

Subsequently, the CPU 36 checks whether the shutter key 15 is depressed (step S19). If the shutter key 15 is not depressed, the CPU 36 keeps checking whether the shutter key 15 is depressed. If the CPU 36 determines that the shutter key 15 is depressed, the CPU 36 executes image sensing processing for the second and subsequent images (step 520).

The CPU 36 generates the second or subsequent sensed image data in the same manner as in step S14 described above, and stores it in the DRAM 29. The CPU 36 transfers this sensed image data to the compression/decompression circuit 30 and makes it compress the data (step S21). Thereafter, the CPU 36 stores this compressed image data in the flash memory 31 in correspondence with page No. data next to the page No. data assigned to the first sensed image data and the panorama flag data "1" (step S22).

The CPU 36 then checks whether the effect key 16 is depressed (step S23). If the effect key 16 is not depressed, the flow returns to step S17 to perform image sensing processing for the next image for the panorama image.

If the CPU 36 determines that the effect key 16 is depressed, the CPU 36 terminates the image sensing processing for a plurality of image data for the panorama image, and calculates the total number of image data sensed for the panorama image (the number of images to be combined into the panorama image) (step S24).

The CPU 36 generates synthesis condition data for the respective image data on the basis of the calculated number of images to be combined into a panorama image, the photographing direction of the panorama image set in the image sensing condition setting processing (see FIG. 5), and the image sensing order of the respective image data sensed for the panorama image (the order in which the images are stored in the flash memory 31, i.e., ascending order of the page No. data) (step S25).

If, for example, the number of images to be combined into a panorama image is three, and the horizontal direction from the left to right is set as the photographing direction of the panorama image, the synthesis condition data of the respective image data sensed for the panorama image are respectively written as "3R-1", "3R-2", and "3R-3" in ascending order of the page No. data.

After the CPU 36 stores the respective generated synthesis condition data in the flash memory 31 in correspondence with the above image data (step S26), this panorama image sensing processing is terminated.

The above description pertains to the sequence of the panorama image sensing processing executed by the CPU 36.

In the above panorama image sensing processing, for the sake of convenience, the horizontal direction from the left to right is set as the photographing direction of the panorama image. However, for example, the horizontal direction from the right to left, the vertical direction from the bottom to top, or the vertical direction from the top to bottom can also be set as the photographing direction of the panorama image. In this case, in photographing the second or subsequent image, the reproduced image display area 12b and the through screen area 12c are set on the display unit 12 (finder), as shown in FIGS. 10A through 10C.

FIG. 11 shows a modification of the set state, in which reproduced image display areas 12b1 through 12b4 and the through screen area 12c are set on the display unit 12 (finder) in photographing the second or subsequent image data in the panorama photographing mode.

Figure 11A:
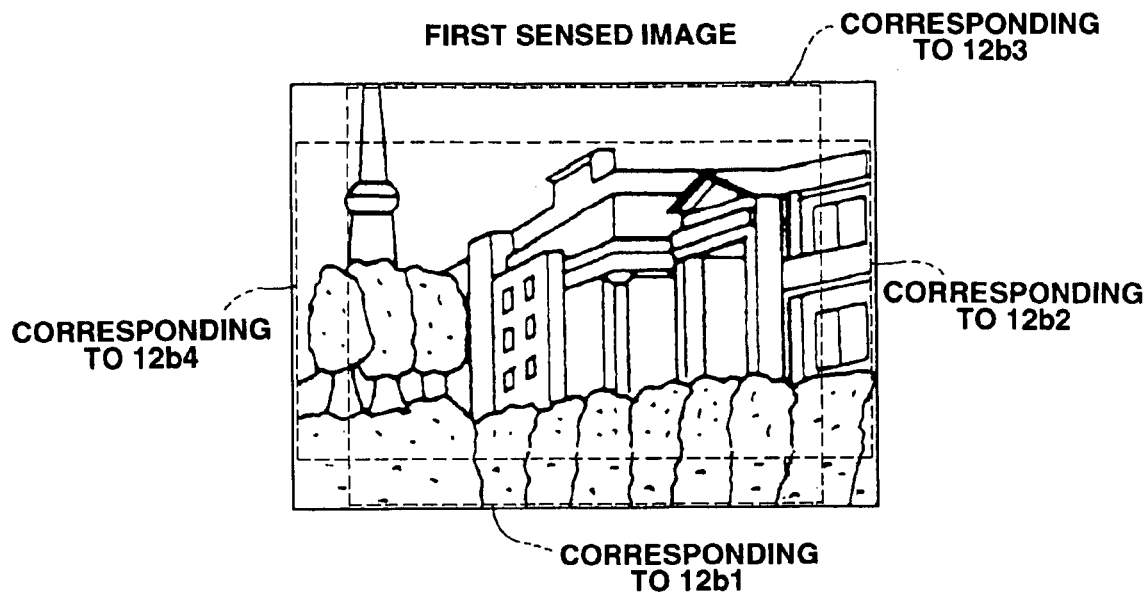
FIGS. 11A and 11B are views showing a modification of the set state of reproduced image display areas 12b1 through 12b4 and the through screen area 12c on the display unit 12 (finder) in photographing for the second or subsequent image data in the panorama photographing mode.
Figure 11B:
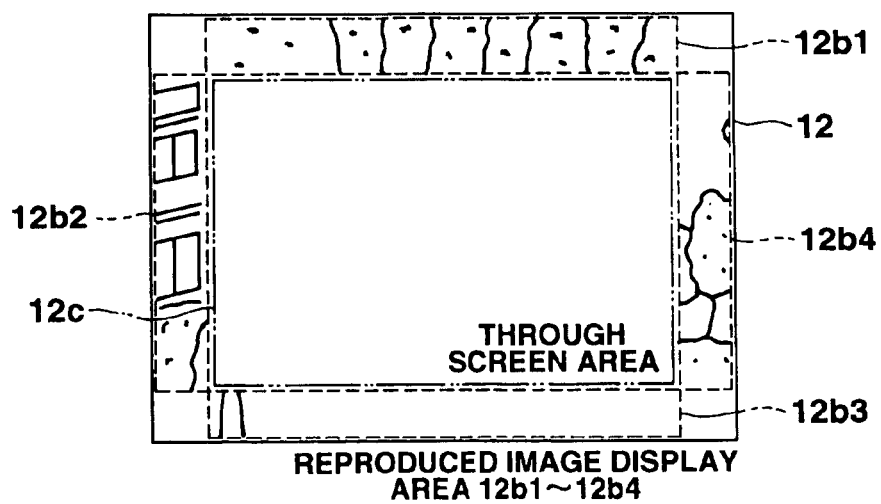

In this modification, when the first image data is sensed, as shown in FIG. 11A, the CPU 36 sets the reproduced image display areas 12b1 through 12b4 and the through screen area 12c on the display screen, as shown in FIG. 11B. The CPU 36 then acquires images corresponding to the areas sizes of the reproduced image display areas 12b1 through 12b4 from the four end portions of the first sensed image data, as shown in FIG. 11A, and reproduces/displays the acquired images in the reproduced image display areas 12b1 through 12b4 on the display screen, and also displays the object image received through the image sensing lens 11 in the through screen area 12c.

With this display control for the finder, the photographing direction of the panorama image can be set by sensing the second image while matching the position of the object image displayed in the through screen area 12c with one of the end portion images of the first sensed image reproduced/displayed in the reproduced image display areas 12b1 through 12b4 of the display unit 12. This obviates the need for setting the photographing direction in the image sensing condition setting processing (see FIG. 5) before photographing operation.

The reproduction display processing executed by the CPU 36 of the digital camera 1 will be described next with reference to the flow charts of FIGS. 12 through 19 and the display examples shown in FIGS. 20A through 20D.

Assume, for the sake of convenience, that in the following reproduction display processing, the image data corresponding to page No. data "1" in the flash memory 31 is not image data for a panorama image, but is normal sensed image data. That is, the panorama flag data of the image data corresponding to page No. data "1" is "0".

When the mode switch 13 is slid to designate the reproduction mode, the CPU 36 reads out the program associated with reproduction display processing from the ROM 33, and starts the processing.

First of all, the CPU 36 performs initialization processing such as initialization (step S31). The CPU 36 then reads out the image data corresponding to page No. data "1" from, for example, the 64 image data stored in the flash memory 31, and makes the compression/decompression circuit 30 decompress the image data. Upon storing the decompressed data in the DRAM 29, the CPU 36 causes the signal generator 25 to convert the data into a video signal by, for example, adding a sync signal to the data and output it to the display unit 12 through the VRAM 26, the D/A converter 27, and the amplifier 28, thereby reproducing/displaying the image data on the display screen (step S32).

Subsequently, the CPU 36 checks whether the "+" key 17a or the "−" key 17b is depressed (step S33). If the CPU 36 determines that neither the key 17a nor the key 17b is depressed, the CPU 36 keeps checking whether the "+" key 17a or the "−"key 17b is depressed.

Assume that the CPU 36 determines that either the "+" key 17a or the key 17b is depressed. In this case, processing is performed in accordance with the depressed key. If the "+" key 17a is depressed, the panorama flag data of the image data corresponding to the next page No. data is read out from the flash memory 31. If, for example, the page No. data of the image data currently reproduced/displayed on the display unit 12 is "1", this page No. data is incremented by (+1), and the panorama flag data of the image data corresponding to page No. data "2" is read out from the flash memory 31. If the "−" key 17b is depressed, the panorama flag data of the image data corresponding to the immediately preceding page No. data is read out from the flash memory 31. If, for example, the page No. data of the image data currently reproduced/displayed on the display unit 12 is. "8", this page No. data is decremented by (−1), and the panorama flag data of the image data corresponding to page No. data. "7" is read out from the flash memory 31 (step S34).

The CPU 36 checks whether the read panorama flag data is "1" (step S35). If the panorama flag data is not "1", i.e., the panorama flag data is "0", the CPU 36 determines that this image data is normal sensed image data. The CPU 36 then reads out the image data from the flash memory 31 and causes the compression/decompression circuit 30 to decompress the image data and store it in the DRAM 29. Then, the CPU 36 causes the signal generator 25 to convert the image data into a video signal by, for example, adding a sync signal to the data and output the signal to the display unit 12, thereby reproducing/displaying the image data on the display screen (step S36). After that, the flow returns to step S33.

If the CPU 36 determines in step 535 that the panorama flag data is "1", the CPU 36 determines that this image data is one of a plurality of image data sensed for a panorama image, and reads out the synthesis condition data stored in the flash memory 31 in correspondence with this image data (step S37).

The CPU 36 then reads out the respective image data forming the panorama image on the basis of this synthesis condition data. If, for example, the synthesis condition data is "3R-1", since the joint picture count data is "3" (three image data), the CPU 36 sequentially reads out the three image data, which are stored in the flash memory 31 upon assignment of the consecutive page No. data thereto by the above panorama image sensing processing (see FIG. 7), from the flash memory 31, and directs the compression/decompression circuit 30 to decompress the image data and transfer the data to the DRAM 29 (step S38).

After this operation, the CPU 36 sets the joining directions and joining order of the respective image data transferred to the DRAM 29 on the basis of the synthesis condition data (photographing direction data and image sensing order data), and synthesizes the respective image data to generate panorama image data (step S39).

In this case, the CPU 36 deletes an end portion image of the second or subsequent image data which overlaps the immediately preceding sensed image (the left end image of the sensed image in FIG. 9D which corresponds to the reproduced image display area 12b in FIG. 9C; the image in the area enclosed within the dashed line in FIG. 13A), and performs joining/synthesizing processing. In this synthesizing processing, the joined boundary portions of the respective image data may be compared with each other to perform color or brightness correction or image processing, e.g, blurring the joined boundary portions.

The CPU 36 transfers the generated panorama image data to the signal generator 25 and directs it to convert the image data into a video signal (display data) by, for example, adding a sync signal to the data, and to temporarily store the panorama image data in the VRAM 26 (step S40). The signal generator 25 outputs the first 1-frame image data (e.g., the 1-frame image data of the left end, the right end, the upper end, the lower end, or the central portion) of the panorama image data (display data) stored in the VRAM 26 to the display unit 12 through the D/A converter 27 and the amplifier 28. Then, as shown in FIG. 20B (in this case, the 1-frame image data of the left end of the panorama image data is being displayed first), the image data is reproduced/displayed on the display screen, and the panorama image mark 12d "P" indicating that the displayed image is a panorama image is displayed on the upper right corner of the display screen (step S41).

Control may be changed to display a message (e.g., "PANORAMA" in FIG. 13D) indicating that the displayed image is a panorama image or a displayed portion notification mark (e.g., the mark shown in FIG. 13C) indicating which part of the panorama image is currently displayed instead of the panorama image mark 12d "P".

Subsequently, the CPU 36 checks whether the "+" key 17a or the "−" key 17b is depressed (step S42). If the CPU 36 determines that neither the key 17a nor the key 17b is depressed, the flow advances to step S44.

If the CPU 36 determines that either the key 17a or 17b is depressed, the CPU 36 scrolls the panorama image in accordance with the depressed key. If, for example, the panorama image currently reproduced/displayed on the display unit 12 is a landscape image as shown in FIG. 20B, the CPU 36 scrolls the displayed image on the display screen to the right in accordance with depression of the "+" key 17a, or scrolls the displayed image on the display screen to the left in accordance with depression of the "−" key 17b (step S43).

More specifically, the CPU 36 sends a scrolling direction control signal to the signal generator 25 in accordance with the depressed key. The signal generator 25 continuously changes/controls the 1-frame image data read out from the VRAM 26 in accordance with this scrolling direction control signal, thereby making the display unit 12 scroll the panorama image.

While the panorama image is scrolled on the display screen, the panorama image mark 12d "P" is kept displayed on the right upper corner of the display screen. If the reproduced/displayed panorama image is a portrait image, the CPU 36 scrolls the displayed image on the display screen upward or downward in accordance with depression of the "+" key 17a or the key 17b.

The CPU 36 then checks whether the effect key 16 is depressed (step S44). If the effect key 16 is not depressed, the flow returns to step S42. If the CPU 36 determines that the effect key 16 is depressed, the CPU 36 determines that reproduction/display of the panorama image is to be terminated, and makes the numerical value of the page No. data skip to the largest value of the page No. data of the respective image data forming the reproduced/displayed panorama image (step S45). Thereafter, the flow returns to step S33.

When the mode switch 13 is slid during execution of this reproduction display processing to designate a shift to a mode other than the reproduction mode, the CPU 36 terminates the reproduction display processing.

The above description relates to the sequence of the reproduction display processing executed by the CPU 36 of the digital camera 1.

In the above reproduction display processing (see FIG. 12), a normal sensed image and a panorama image are reproduced/displayed on the display unit 12 of the digital camera 1. Obviously, however, if an external device such as a TV receiver is connected to the video output terminal 18b of the digital camera 1 through a video cable, similar reproduction display processing can be performed on the display screen of the device.

Figure 12:
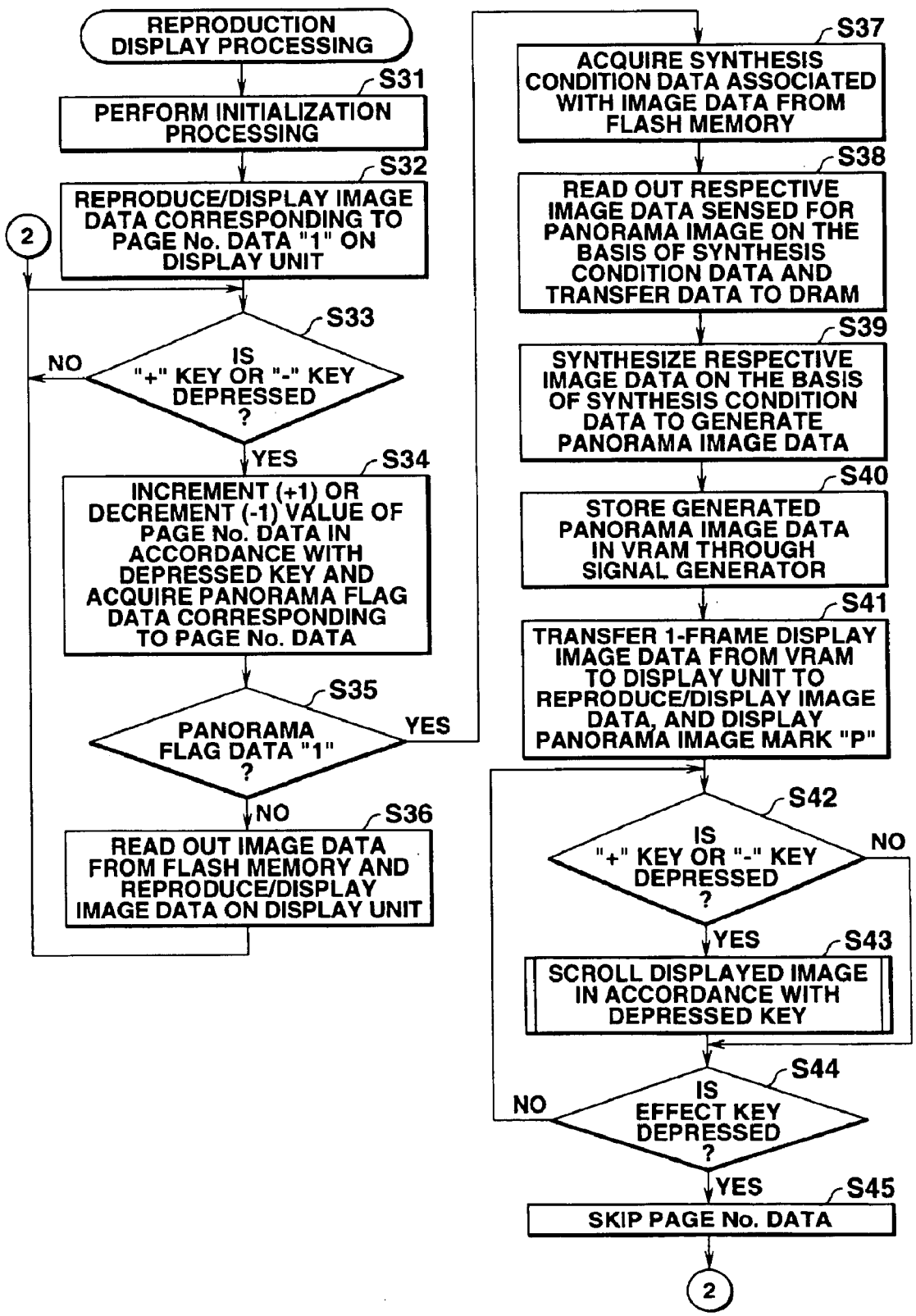
FIG. 12 is a flow chart showing the reproduction display processing executed by the CPU 36 in FIG. 2.
Figure 13:
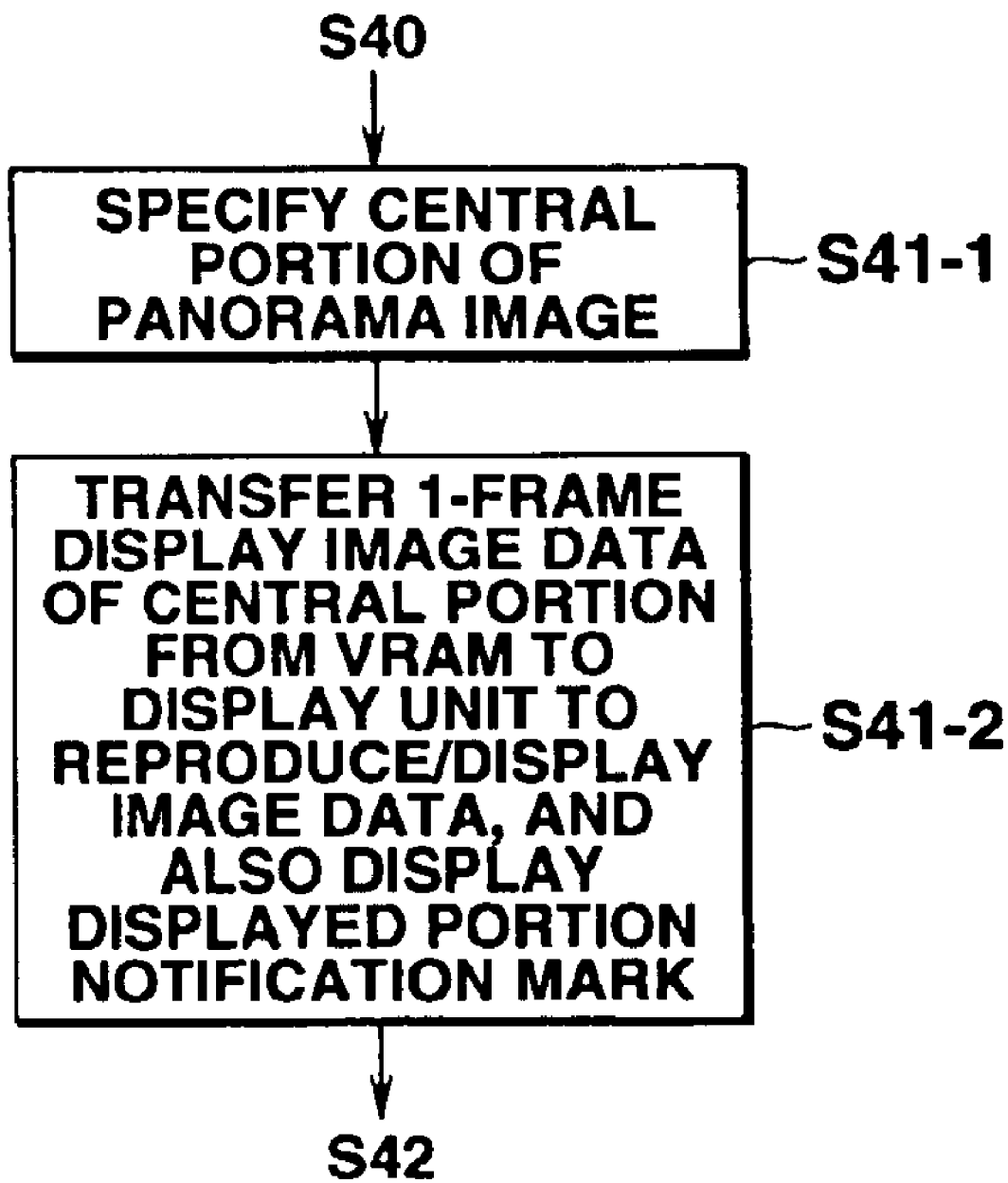
FIG. 13 is a view showing a modification of step 541 in the flow chart for the reproduction display processing in FIG. 12.

Note that the processing shown in FIG. 13 may be performed instead of the processing in step S41 in the above reproduction display processing (see FIG. 12).

After the panorama image is stored in the VRAM 26 in step S40, a central portion (1-frame portion) of the panorama image is detected (step S41-1).

If, for example, the panorama image is composed of three sensed images, the second sensed image is extracted. If the panorama image is composed of four sensed images, halves of the second and third sensed images are extracted.

After the above operation, 1-frame image data of the central portion extracted in step S41-1 is transferred to the display unit 12 to be reproduced/displayed on the display screen, as shown in FIG. 20C. In addition, a displayed portion notification mark (also indicating that the displayed image is a panorama image) indicating which part of the panorama image is currently displayed is displayed on the lower right corner of the display screen (step S41-2).

The flow then advances to step S42.

The processing in step S43 (scrolling processing) in the above reproduction display processing (see FIG. 12) will be described next with reference to the flow chart of FIG. 14.

First of all, the CPU 36 checks whether the key depressed in step S42 is the "+" key 17a or the key 17b (step SA1).

If the CPU 36 determines that the "+" key 17a is depressed, the CPU 36 checks whether the panorama image data stored in the VRAM 26 is a landscape image (step SA2).

If the CPU 36 determines that the panorama image is a landscape image, the CPU 36 checks whether the right end image of the panorama image is being displayed on the display unit 12 (step SA3). If the right end image is not displayed, the CPU 36 scrolls the displayed image on the display screen to the right (step SA4), and the flow shifts to step S44.

If the CPU 36 determines in step SA3 that the right end image is being displayed, i.e., no image data to be displayed on the further right side of the display unit 12 is stored in the VRAM 26, the flow shifts to step S44 without scrolling the displayed image.

If the CPU 36 determines in step SA2 that the image is not a landscape image but a portrait image, the CPU 36 checks whether the upper end image of the panorama image is being displayed on the display unit 12 (step SA5). If the upper end image is not displayed, the CPU 36 scrolls the displayed image on the display screen upward (step SA6), and the flow shifts to step S44.

If the CPU 36 determines in step SA5 that the upper end image is being displayed, the flow shifts to step 544 without scrolling the displayed image.

If the CPU 36 determines in step SA1 that the key 17b is depressed, the CPU 36 checks whether the panorama image data is a landscape image, as in the processing in step SA2 (step SA7).

If the CPU 36 determines that the data is a landscape image, the CPU 36 checks whether the left end image of the panorama image (see FIG. 20B) is being displayed on the display unit 12 (step SA8). If the left end image is not being displayed, the CPU 36 scrolls the displayed image on the display screen to the left (step SA9). The flow then shifts to step S44.

If the CPU 36 determines in step SA8 that the left end image is being displayed, the flow shifts to step S44 without scrolling the displayed image.

If the CPU 36 determines in step SA7 that the image is not a landscape image but is a portrait image, the CPU 36 checks whether the lower end image of the panorama image is being displayed on the display unit 12 (step SA10). If the lower end image is not being displayed, the CPU 36 scrolls the displayed image on the display screen downward (step SA11). The flow then shifts to step S44.

If the CPU 36 determines in step SA10 that the lower end image is being displayed, the flow shifts to step S44 without scrolling the displayed image.

The above description concerns the sequence of scrolling processing (the processing in step S43 in FIG. 12) executed by the CPU 36 of the digital camera 1.

Figure 14:
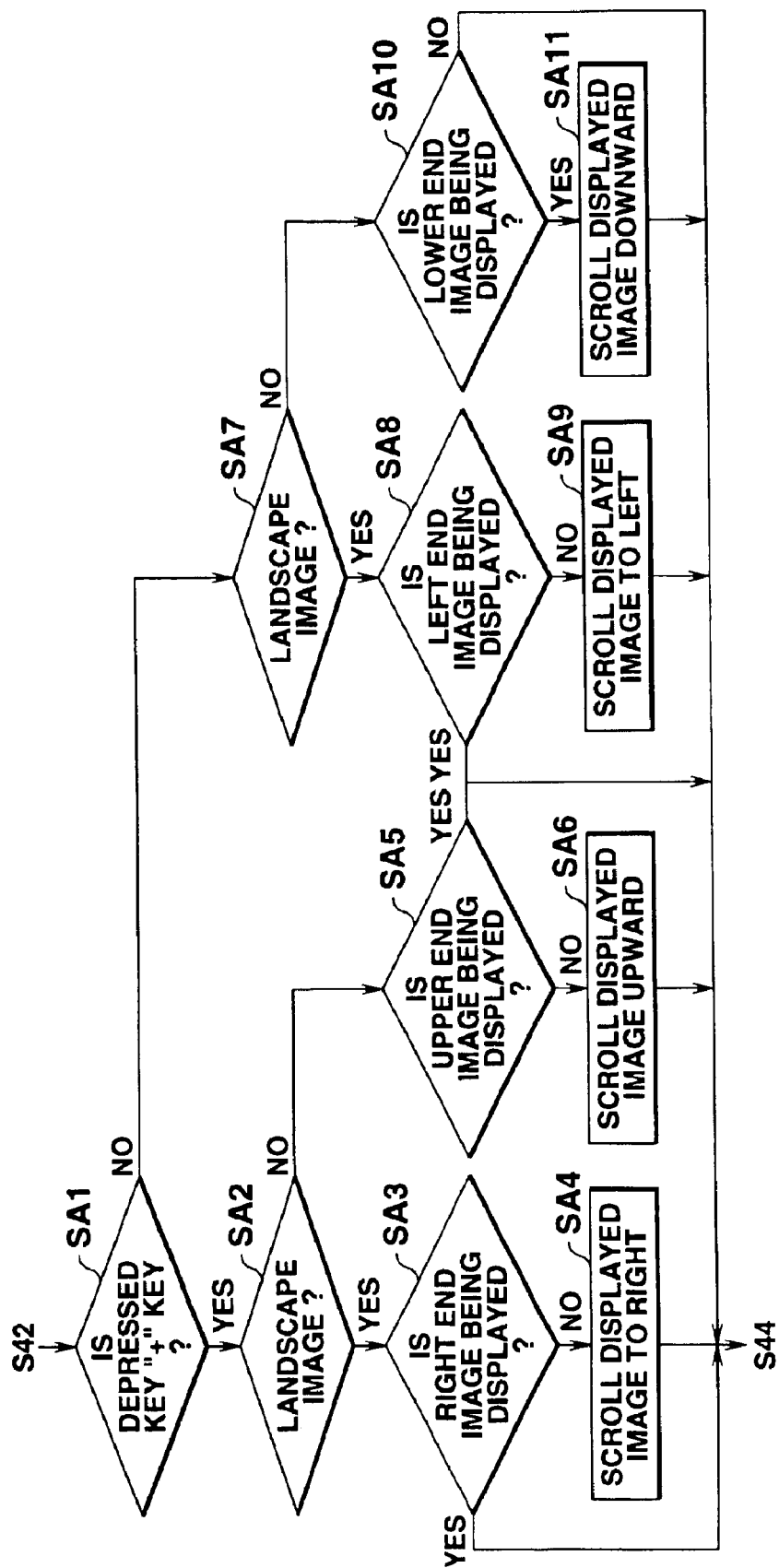
FIG. 14 is a flow chart showing step S43 in the flow chart for the reproduction display processing in FIG. 12 in detail.

In the above scrolling processing in FIG. 14, while the "+" key 17a or the "−" key 17b is depressed, scrolling processing is executed. However, control may be changed to start scrolling at the instant the "+" key 17a or the "−" key 17b is depressed, and stop it when a stop key (e.g., the effect key 16) is depressed.

Figure 15:
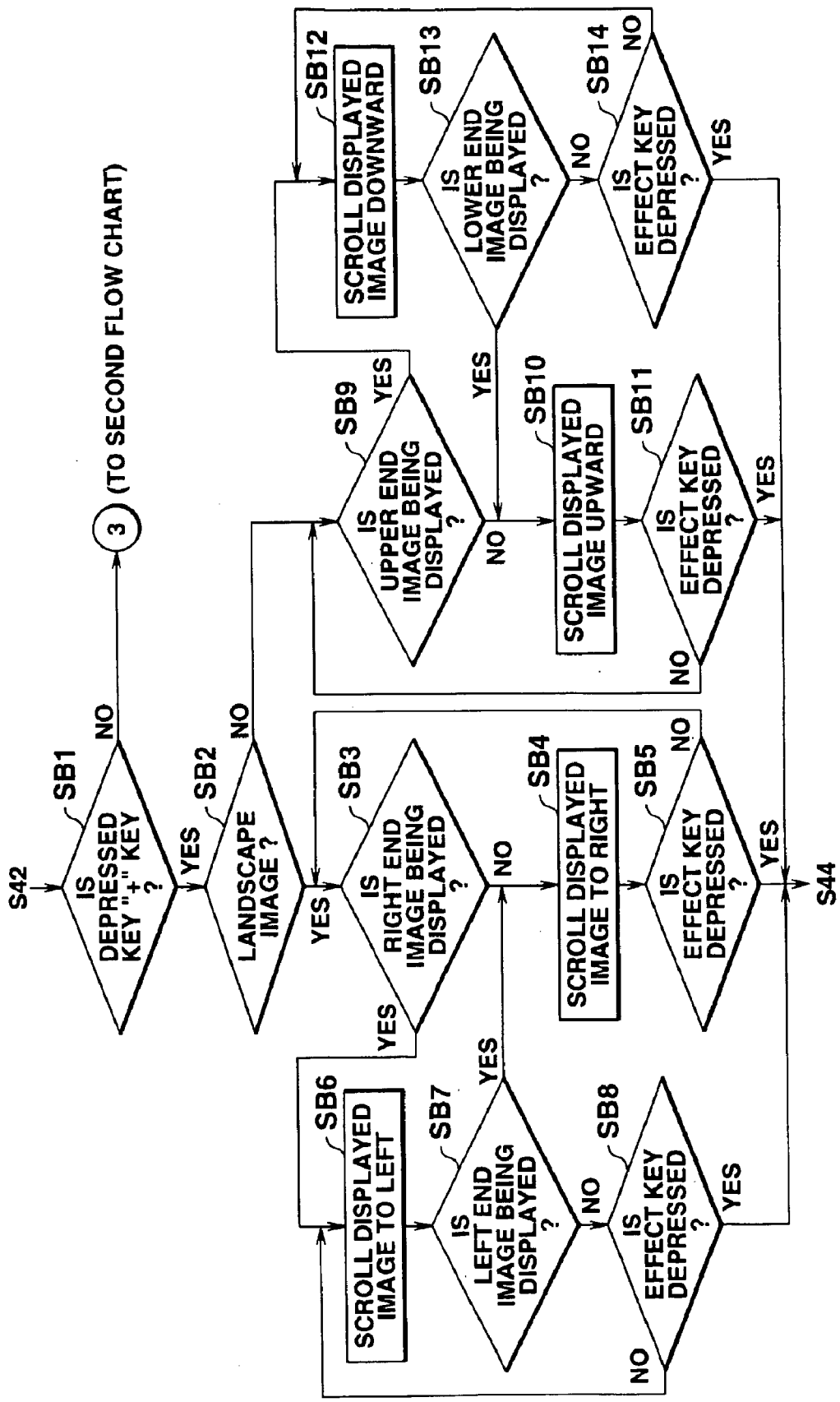
FIG. 15 is a view showing modification 1 (first view) of the detailed flow chart in FIG. 14.
Figure 16:
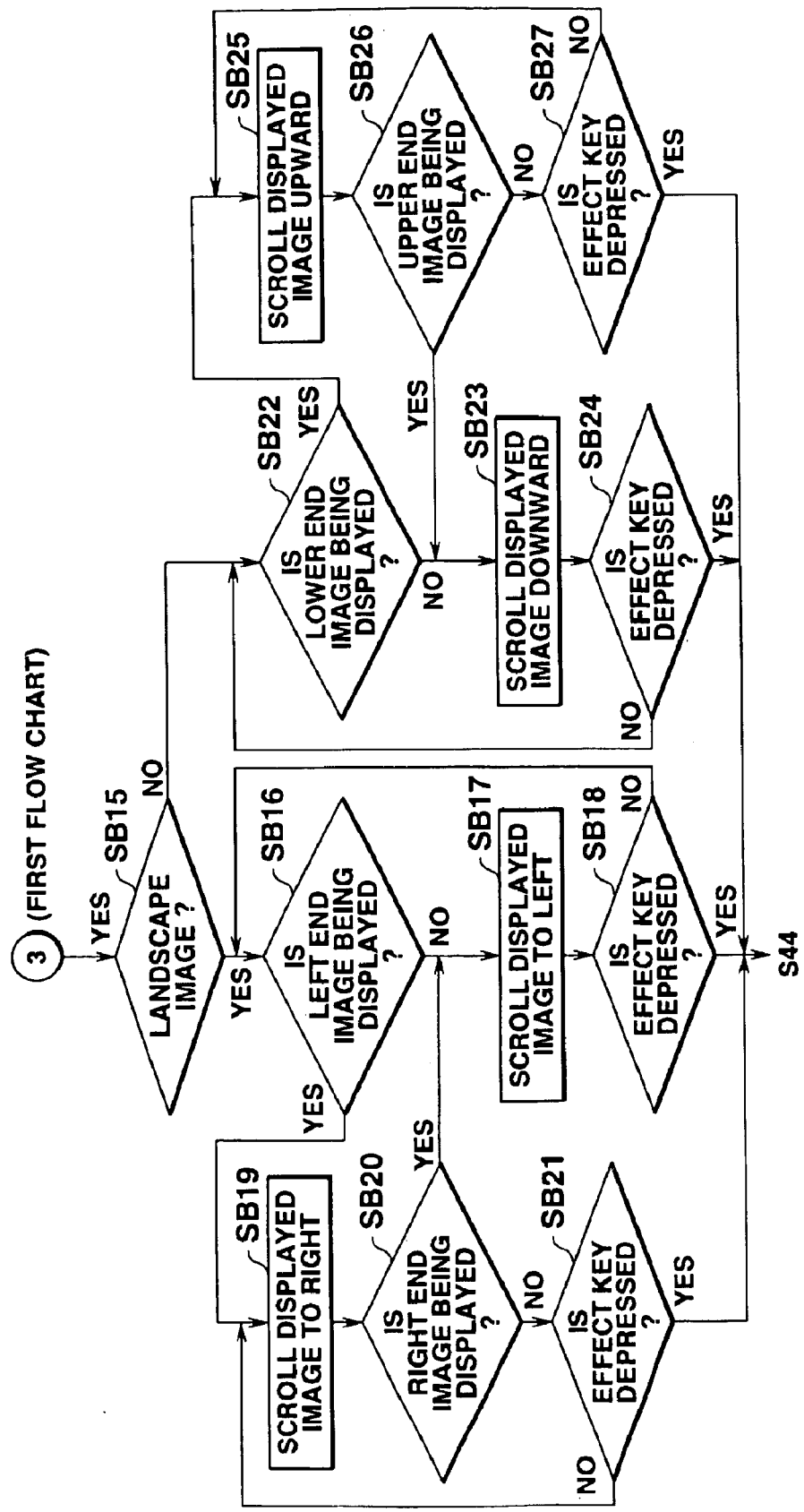
FIG. 16 is a view showing modification 1 (second view) of the detailed flow chart in FIG. 14.
Figure 17:
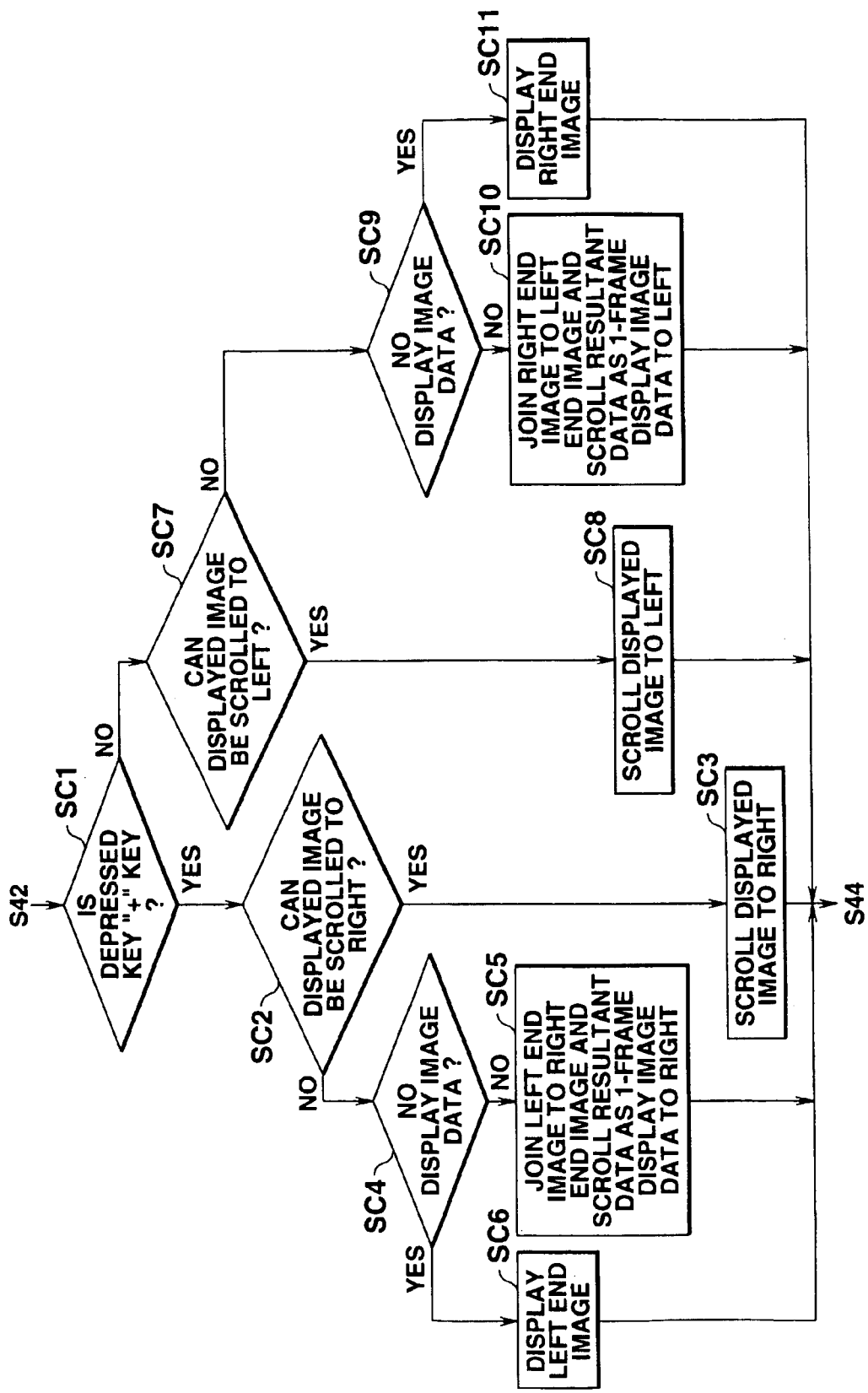
FIG. 17 is a view showing modification 2 of the detailed flow chart in FIG. 14.

The above scrolling processing (the processing in step S43 in FIG. 12) may be performed by the control shown in FIGS. 15 through 17.

Modifications 1 and 2 of this scrolling processing will be described below.

Modification 1 of the scrolling processing, which is shown in FIGS. 15 and 16, will be described first.

In modification 1 of the scrolling processing, first of all, the CPU 36 checks whether the key depressed in step S42 is the "+" key 17a or the "−" key 17b (step SB1).

If the CPU 36 determines that the "+" key 17a is depressed, the CPU 36 checks whether the panorama image data stored in the CPU 36 is a landscape image (step SB2).

If the CPU 36 determines that the data is a landscape image, the CPU 36 checks whether the right end image of the panorama image is being displayed on the display unit 12 (step SB3). If the right end image is not being displayed, the CPU 36 starts scrolling the displayed image on the display screen to the right (step SB4).

The CPU 36 then checks whether the effect key 16 is depressed (step SB5). If the effect key 16 is depressed, the CPU 36 stops the rightward scrolling performed in step SB4. The flow then shifts to step S44 in FIG. 12.

If the CPU 36 does not detect depression of the effect key 16 in step SB5, the flow returns to step SB3, and the CPU 36 keeps executing the rightward scrolling in step SB4 until the CPU 36 determines in step SB3 that the right end image is being displayed on the display unit 12 or determines in step SB5 that the effect key 16 is depressed.

If the CPU 36 determines in step SB3 that the right end image is being displayed, the CPU 36 starts scrolling the displayed image on the display screen to the left (step SB6).

That is, the scrolling direction is reversed.

Subsequently, the CPU 36 keeps executing the leftward scrolling in step SB6 until the CPU 36 determines in step SB7 that the left end image is being displayed on the display unit 12 or determines in step SB8 that the effect key 16 is depressed.

If depression of the effect key 16 is detected in step SB8, the leftward scrolling in step SB6 is stopped. The flow then shifts to step S44 in FIG. 12.

It the CPU 36 determines in step SB7 that the left end image is being displayed, the flow shifts to step SB4 to start scrolling the displayed image on the display screen to the right (opposite direction).

If the CPU 36 determines in step SB2 that the image is not a landscape image but is a portrait image, the CPU 36 checks whether the upper end image of the panorama image is being displayed on the display unit 12 (step SB9). If the upper end image is not being displayed, the CPU 36 starts scrolling the displayed image on the display screen upward (step SB10).

Subsequently, the CPU 36 checks whether the effect key 16 is depressed (step SB11). If depression of the effect key 16 is detected, the CPU 36 stops the upward scrolling in step SB10. The flow then shifts to step S44 in FIG. 12.

If depression of the effect key 16 is not detected in step SB11, the flow returns to step SB9. Subsequently, the CPU 36 keeps executing the upward scrolling in step SB10 until the CPU 36 determines in step SB9 that the upper end image is being displayed or determines in step SB11 that the effect key 16 is depressed.

If the CPU 36 determines in step SB9 that the upper end image is being displayed on the display unit 12, the CPU 36 starts scrolling the displayed image on the display screen downward (step SB12).

Subsequently, the CPU 36 keeps executing the downward scrolling in step SB12 until the CPU 36 determines in step SB13 that the lower end image is being displayed or determines in step SB14 that the effect key 16 is depressed.

If depression of the effect key 16 is detected in step SB14, the CPU 36 stops the scrolling processing performed in step SB12. The flow then shifts to step S44 in FIG. 12.

If the CPU 36 determines in step SB13 that the lower end image is being displayed on the display unit 12, the flow shifts to step SB10 to start scrolling the displayed image on the display screen upward.

If the CPU 36 determines in step SB1 that the "−" key 17b is depressed, the CPU 36 checks whether the panorama image data stored in the VRAM 26 is a landscape image (step SB15).

If the CPU 36 determines that the data is a landscape image, the CPU 36 checks whether the left end image of the panorama image is being displayed on the display unit 12 (step SB16). If the left end image is not being displayed, the CPU 36 starts scrolling the displayed image on the display screen to the left (step SB17).

The CPU 36 then checks whether the effect key 16 is depressed (step SB18). If depression of the effect key 16 is detected, the CPU 36 stops the leftward scrolling in step SB17. Thereafter, the flow shifts to step S44 in FIG. 12.

If depression of the effect key 16 is not detected in step SB18, the flow returns to step SB16. Subsequently, the CPU 36 keeps executing the leftward scrolling in step SB17 until the CPU 36 determines in step SB16 that the left end image is being displayed on the display unit 12 or determines in step SB18 that the effect key 16 is depressed.

If the CPU 36 determines in step SB16 that the left end image is being displayed on the display screen, the CPU 36 starts scrolling the displayed image on the display screen to the right (step SB19).

Subsequently, the CPU 36 keeps executing the rightward scrolling in step SB21 until the CPU 36 determines in step SB20 that the right end image is being displayed on the display unit 12 or determines in step SB21 that the effect key 16 is depressed.

If depression of the effect key 16 is detected in step SB21, the CPU 36 stops the rightward scrolling performed in step SB19. The flow then shifts to step S44 in FIG. 12.

If the CPU 36 determines in step SB20 that the right end image is being displayed on the display unit 12, the flow shifts to step SB17 to start scrolling the displayed image on the display screen to the left (opposite direction).

If the CPU 36 determines in step SB15 that the image is not a landscape image but is a portrait image, the CPU 36 determines whether the lower end image of the panorama image is being displayed on the display unit 12 (step SB22). If the lower end image is not being displayed, the CPU 36 starts scrolling the displayed image on the display screen downward (step SB23).

The I/o port 37 checks whether the effect key 16 is depressed (step SB24). If depression of the effect key 16 is detected, the CPU 36 stops the downward scrolling performed in step SB23. The flow then shifts to step S44 in FIG. 12.

If depression of the effect key 16 is not detected in step SB24, the flow returns to step SB22. Subsequently, the CPU 36 keeps executing the downward scrolling performed in step SB23 until the CPU 36 determines in step SB22 that the lower end image is being displayed on the display unit 12 or determines in step SB24 that the effect key 16 is depressed.

If the CPU 36 determines in step SB22 that the lower end image is being displayed on the display unit 12, the CPU 36 starts scrolling the displayed image on the display screen upward (step SB25).

Subsequently, the CPU 36 keeps executing the upward scrolling performed in step SB25 until the CPU 36 determines in step SB26 that the upper end image is being displayed or determines in step SB27 that the effect key 16 is depressed.

If detection of the effect key 16 is detected in step SB27, the CPU 36 stops the scrolling processing performed in step SB25. The flow then shifts to step S44 in FIG. 12.

If the CPU 36 determines in step SB26 that the upper end image is being displayed on the display unit 12, the flow shifts to step SB23 to start scrolling the displayed image on the display screen downward.

The above description pertains to the sequence of modification 1 of the scrolling processing executed by the CPU 36 of the digital camera 1.

In modification 1 of the scrolling processing in FIGS. 15 and 16, when the "+" key 17a or the "−" key 17b is depressed, scrolling processing is started; when the effect key 16 is depressed, the scrolling processing is stopped. However, control may be changed to continuously execute scrolling processing while the "+" key 17a or the "−" key 17b is depressed.

In the above reproduction display processing (FIG. 12) and modification 1 (FIGS. 15 and 16) of the scrolling processing, the processing of modification 1 of the scrolling processing is started when the "+" key 17a or the "−" key 17b is depressed in step S42. However, control may be changed to automatically start scrolling processing of reversing (returning) the scrolling direction at the two ends of the panorama image (the processing in steps SB2 through SB14 or the processing in steps SB15 through SB27) upon selection of reproduction/display of the panorama image by omitting the processing in steps S42 and SB1.

Modification 2 of the scrolling processing shown in FIG. 17 will be described next.

Assume that in modification 2 of the scrolling processing, which will be described below, the panorama image data displayed in step S41 in FIG. 12 is a landscape image (i.e., not a portrait image), for the sake of descriptive convenience.

In modification 2 of the scrolling processing, first of all, the CPU 36 determines whether the key depressed in step S42 is the "+" key 17a or the "−" key 17b (step SC1).

If the CPU 36 determines that the "+" key 17a is depressed, the CPU 36 checks whether the displayed image can be scrolled to the right by the amount corresponding to the depressing operation, i.e., all the image data for 1 frame (1-frame data) required to display the image even after scrolling can be ensured (step SC2).

If the CPU 36 determines in step SC2 that the displayed image can be scrolled to the right by the amount corresponding to the depressing operation in step S42, the CPU 36 scrolls the displayed image to the right (step SC3). The flow then shifts to step S44.

If the CPU 36 determines in step SC2 that the displayed image cannot be scrolled to the right by the amount corresponding to the depressing operation, the CPU 36 also checks whether no (hardly any) image data can be ensured when the displayed image is scrolled to the right by the amount corresponding to the depressing operation (step SC4).

If the CPU 36 determines that the right end image data can be partially ensured, the CPU 36 joins the left side of the left end image (the image portion indicated by a dashed line 12a in FIG. 20D) to the right side of the right end image (the image portion indicated by the dashed line 12b in FIG. 20D) of the partial right end image of a portion smaller in data amount than 1-frame data, thereby generating 1-frame image data. The CPU 36 then scrolls the displayed image on the display unit 12 (step SC5). Thereafter, the flow shifts to step S44.

Assume that the displayed image is scrolled to the right in step SC4. In this case, if the CPU 36 determines that the image data of the right end cannot be ensured 100%, a 1-frame left end image is displayed on the display unit 12 (step SC6). The flow then shifts to step S44.

If the CPU 36 determines in step SC1 that the key 17b is depressed, the CPU 36 checks if the displayed image can be scrolled to the left by the amount corresponding to the depressing operation, i.e., if all data (1-frame image) of one frame required for scrolling can be ensured (step SC7).

If the CPU 36 determines in step SC7 that the displayed image can be scrolled to the left by the amount corresponding to the depressing operation in step S42, the CPU 36 scrolls the image to the right (step SC8). The flow then shifts to step S44.

If the CPU 36 determines in step SC7 that the displayed image cannot be scrolled to the left by the amount corresponding to the depressing operation, the CPU 36 checks whether no image data can be ensured when the displayed image is scrolled to the left by the amount corresponding to the depressing operation (step SC9).

If the CPU 36 determines that the image data of the left end can be partially ensured, the CPU 36 joins the right side of the right end image (the image portion indicated by the dashed line 12b in FIG. 20D) to the left side of the partial left end image (the image portion indicated by the dashed line 12a in FIG. 20D) smaller in data amount than 1-frame image data, thereby generating 1-frame image data and displaying it on the display unit 12 (step SC10). The flow then shifts to step S44.

If the CPU 36 determines in step SC9 that the left end image data cannot be ensured 100% if the displayed image is scrolled to the left, the CPU 36 displays the right end image of the 1-frame image data (step SC11). The flow then shifts to step S44.

The above description concerns the sequence of =modification 2 of the scrolling processing executed by the CPU 36 of the digital camera 1.

In modification 2 of the scrolling processing in FIG. 17, while the "+" key 17a or the "−" key 17b is depressed, scrolling processing is executed. However, control may be changed to start scrolling at the instant the "+" key 17a or the "−" key 17b is depressed, and to stop it when a stop key (e.g., the effect key 16) is depressed.

In modification 2 of the scrolling processing in FIG. 17, the control configuration may be designed such that the processing in steps SC4 and SC5 and the processing in steps SC9 and SC10 are omitted, i.e., the flow immediately shifts to step SC6 (SC11) when NO is determined in step SC2 (SC7).

In the above reproduction display processing (FIG. 12) and modification 2 (FIG. 17) of the scrolling processing, when the "+" key 17a or the "−" key 17b is depressed in step S42, the processing of modification 2 of the scrolling processing is started. However, control may be changed to start scrolling processing (the processing in steps SC2 through SC6 or the processing in steps SC7 to SC11) of scrolling in a predetermined direction upon selection of reproduction/display of the panorama image by omitting the processing in steps S42 and SC1.

Figure 18:
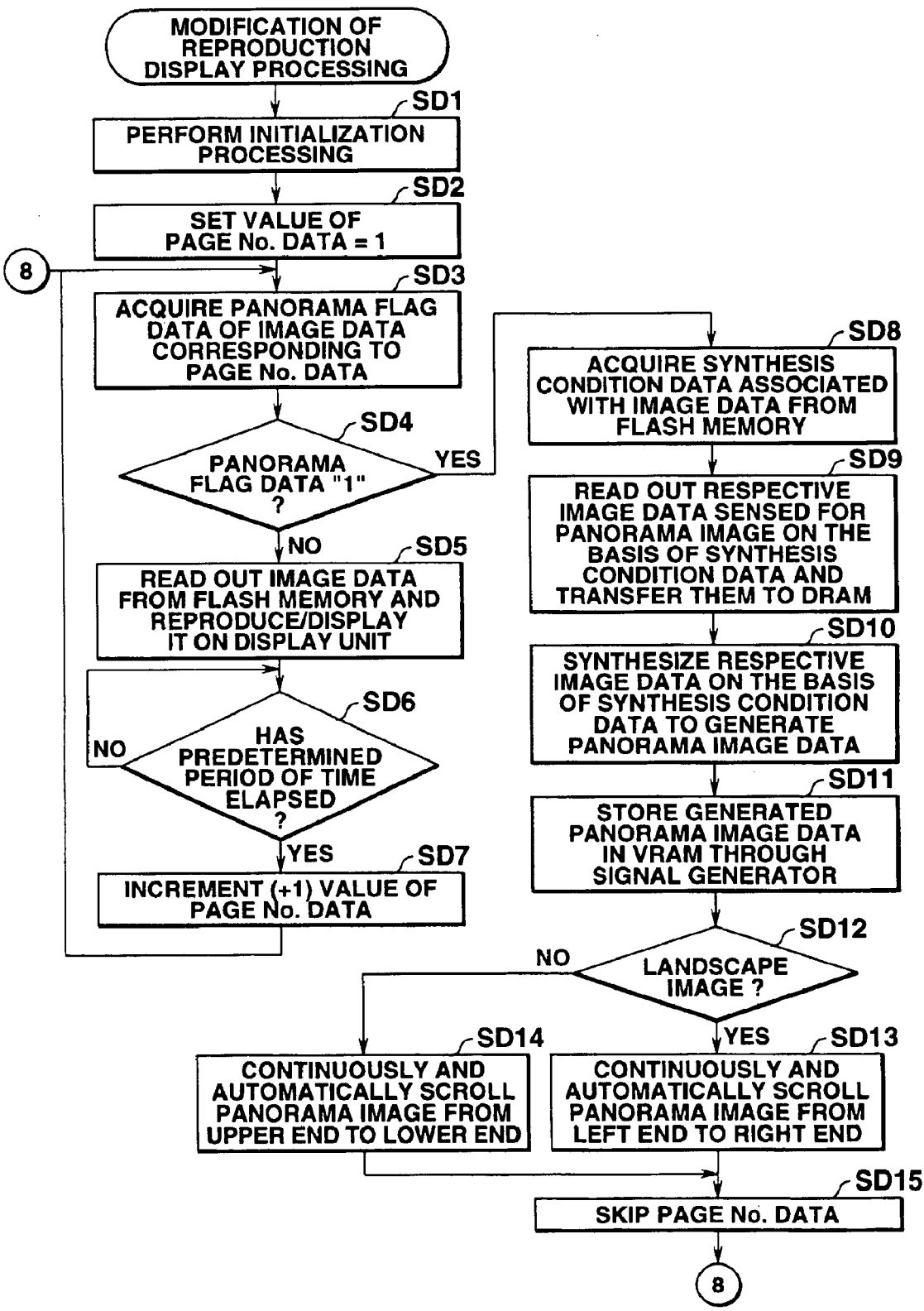
FIG. 18 is a view showing a modification of the flow chart for the reproduction display processing in FIG. 12.

The above reproduction display processing (FIG. 12) may be performed by a control configuration like the one shown in FIG. 18.

A modification of this reproduction display processing will be described below.

In the modification of the reproduction display processing, the CPU 36 performs initialization processing such as initialization (step SD1) first, and then sets "1" as page No. data in the work memory 34a (step SD2).

Thereafter, the CPU 36 reads out the value of the panorama flag data of the image data corresponding to the page No. data set in the work memory 34a from the flash memory 31 (step SD3).

The CPU 36 checks whether the read value of the panorama flag data is "1" (step SD4). If the value of the panorama flag data is not "1", i.e., the value of the panorama data is "0", the CPU 36 determines that this image data is normal photographed image data. The CPU 36 then reads out the image data from the flash memory 31, directs the compression/decompression circuit 30 to decompress the image data, and stores it in the DRAM 29. The CPU 36 controls the signal generator 25 to convert the image data into a video signal by, e.g., adding a sync signal to the data and output the signal to the display unit 12 through the VRAM 26, the D/A converter 27, and the amplifier 28, thereby reproducing/displaying the image data on the display screen (step SD5).

The CPU 36 determines whether a predetermined period of time (e.g., two seconds) has elapsed since reproduction/display of the image data was started in step SD4 (step SD6).

If the CPU 36 determines that the predetermined period of time has elapsed, the CPU 36 increments the value of the page No. data set in the work memory 34a (step SD7), and the flow returns to step SD3.

If the CPU 36 determines in step SD4 that the value of the panorama flag data is "1", the CPU 36 determines that this image data is one of a plurality of image data sensed for a panorama image. First of all, the CPU 36 reads out the synthesis condition data stored in the flash memory 31 in correspondence with this image data (step SD8).

The CPU 36 then sequentially reads out the image data forming the panorama image from the flash memory 31 on the basis of this synthesis condition. If, for example, the synthesis condition data is "3R-1", since the joint picture count data is "3", (three image data), the CPU 36 sequentially reads out the three image data stored in the flash memory 31 to which the consecutive page No. data are assigned by the above panorama image sensing processing (see FIG. 7). The CPU 36 causes the compression/decompression circuit 30 to decompress the image data and transfers the resultant data to the amplifier 28 (step SD9).

After this operation, the CPU 36 sets the joining direction and order of the respective image data transferred to the DRAM 29 on the basis of the synthesis condition data (photographing direction data and image sensing order data), and synthesizes the respective image data to generate panorama image data (step SD10).

The CPU 36 transfers the generated panorama image data to the signal generator 25, and directs it to convert the image data into a video signal by adding a sync signal to the data. The CPU 36 then temporarily stores the panorama image data in the VRAM 26 (step SD11).

The CPU 36 then checks whether the panorama image data stored in the VRAM 26 is landscape image data (step SD12). If the CPU 36 determines that the image data is landscape image data, the CPU 36 reproduces/displays the left (right) end image (1-frame image data) of the panorama image on the display screen first, and then continuously scrolls the displayed image to the right (left) until the right (left) end image is reproduced/displayed (step SD13).

If the CPU 36 determines in step SD12 that the image data is portrait image data, the CPU 36 reproduces/displays the upper (lower) end image (1-frame image data) of the panorama image on the display screen first, and then continuously scrolls downward (upward) until the lower (upper) end image is reproduced/displayed (step SD14).

When the right (left) end image or the lower (upper) end image is reproduced/displayed after scrolling in step SD13 or SD14, the CPU 36 changes the value of the page No. data set in the work memory 34a to the value obtained by incrementing the largest value among the page No. data of the respective image data constituting the reproduced/displayed panorama image (step SD15). Thereafter, the flow returns to step SD3.

The above description is directed to the sequence of the modification of the reproduction display processing executed by the CPU 36 of the digital camera 1.

Control may be changed to perform the processing in steps SD12 through SD14 in the modification (FIG. 18) of the reproduction display processing instead of the processing in step S41 in the reproduction display processing (FIG. 12). That is, when reproduction/display of a panorama image is selected, the panorama image may be automatically scrolled throughout the image. After that, the displayed image may be scrolled when the "+" key 17a or the "−" key 17b is depressed.

Control may be changed to perform the processing in steps SD12 through SD14 in the modification (FIG. 18) of the reproduction display processing instead of the processing in step S43 in the reproduction display processing (FIG. 12). That is, a panorama image may be automatically scrolled throughout the image when the "+" key 17a or the "−" key 17b is depressed.

Figure 19:
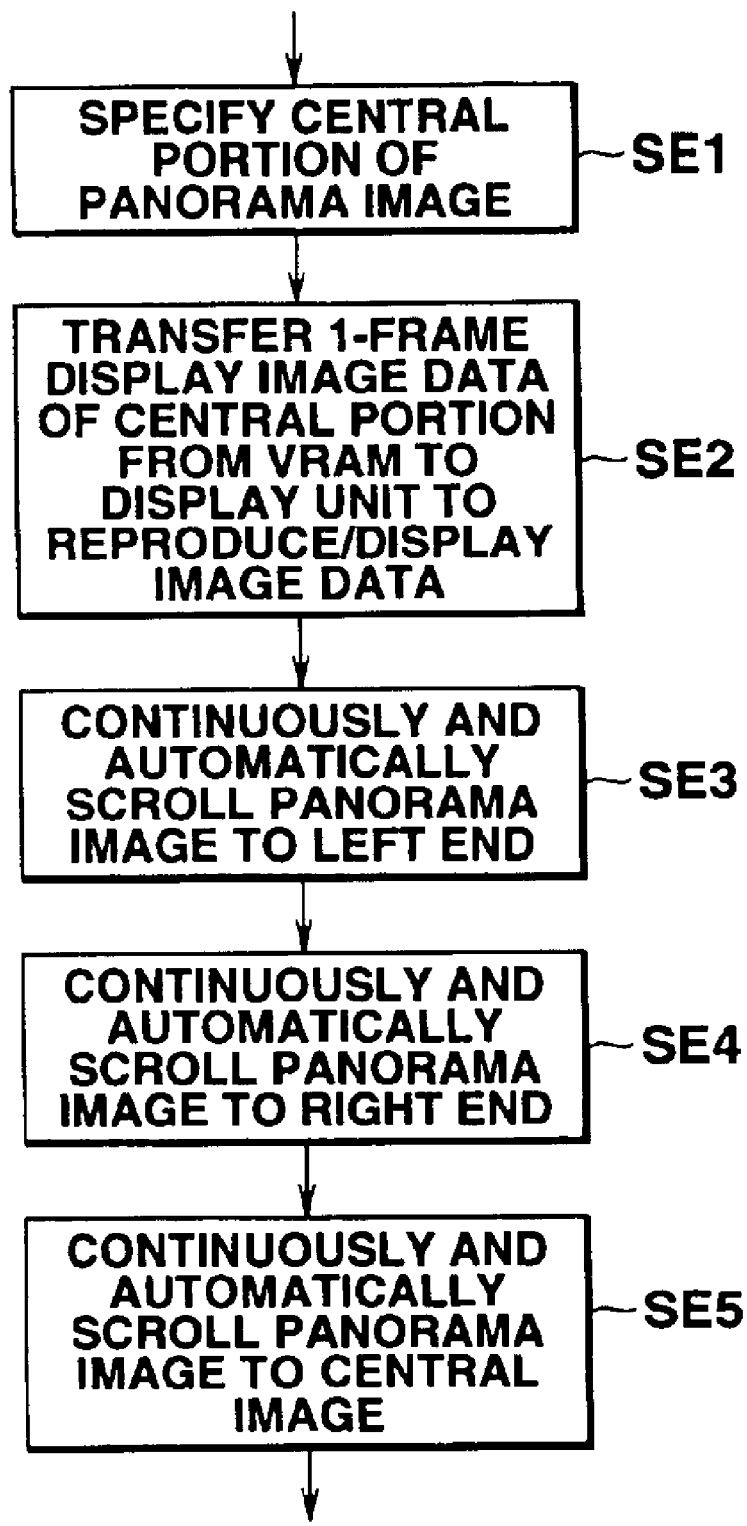
FIG. 19 is a view showing a modification of step SD13 in the modification of the flow chart for the reproduction display processing in FIG. 18.

In addition, the processing shown in FIG. 19 may be performed instead of the processing in step SD13 in the modification (see FIG. 18) of the reproduction display processing.

More specifically, if the CPU 36 determines in step SD12 that the image data is landscape image data, the CPU 36 detects the central portion (1-frame image data) of the panorama image stored in the VRAM 26 (step SE1).

If, for example, the panorama image is composed of three photographed images, the second photographed image is extracted. If the panorama image is composed of four photographed images, halves of the second and third photographed images are extracted.

After this operation, the CPU 36 transfers the 1-frame image data of the central portion extracted in step SE1 to the display unit 12, and reproduces/displays the image data on the displayed screen, as shown in FIG. 20C (step SE2).

Subsequently, the CPU 36 continuously scrolls the displayed image to the left (right) until the left (right) end image is reproduced/displayed (step SE3). The CPU 36 then reverses the scrolling direction to continuously scroll the displayed image to the right (left) until the right (left) end image is reproduced/displayed (step SE4).

When the right (left) end image is reproduced/displayed, the CPU 36 reverses the scrolling direction and continuously scrolls the displayed image to the left (right) until the image of the central portion is reproduced/displayed (step SE5). Thereafter, the flow shifts to step SD15.

Obviously, the processing shown in FIG. 19 can be performed instead of the processing in step SD14 in the modification (see FIG. 18) of the reproduction display processing.

In addition, control may be modified to perform the processing shown in FIG. 19 instead of the processing in step S41 in the reproduction display processing (FIG. 12). That is, when reproduction/display of a panorama image is selected, scrolling is automatically performed by the method shown in FIG. 19. Thereafter, when the "+" key 17a or the "−" key 17b is depressed, scrolling is performed.

The communication processing executed by the CPU 36 of the digital camera 1 will be described next with reference to the flow charts of FIGS. 21 and 22.

When the mode switch 13 is slid to designate the communication mode, the CPU 36 reads out the program associated with communication processing corresponding to the communication form of data communication performed between the digital camera 1 and an external device from the ROM 33, and starts the processing.

The communication processing to be described below concerns a case wherein the image data stored in the flash memory 31 of the digital camera 1 is transferred to an external device having an infrared communication function by infrared communication (IrDA scheme) using the infrared communication unit 38.

First of all, in steps S51 through S67, the CPU 36 performs processing similar to the processing in steps S31 through S45 in the above reproduction display processing (see FIG. 12) so as to sequentially switch/display the normal sensed image data stored in the flash memory 31 and the panorama image data generated by synthesizing a plurality of image data in accordance with depression of the "+" key 17a or the "−" key 17b.

When the shutter key 15 is depressed (step S53 or S63), the CPU 36 designates the image data (normal sensed image data or panorama image data) that is reproduced/displayed when the shutter key 15 is depressed as image data to be transferred to the external device (step S68).

The CPU 36 sets various communication conditions such as the transfer rate, pulse width, and modulation scheme to transfer the data to the distant external device, to which infrared communication (IrDA scheme) is to be performed, in accordance with a predetermined communication protocol (step S69).

After this operation, the CPU 36 transfers the image data (normal sensed image data or panorama image data generated by image synthesis), which is mapped in the DRAM 29 to be reproduced/displayed on the display unit 12 and designated as image data to be transferred, to the compression/decompression circuit 30, and directs the compression/decompression circuit 30 to compress the data. Thereafter, the CPU 36 outputs this image data to the infrared communication unit 38, and transfers the image data from the infrared communication unit 38 to the distant external device by using infrared pulses (step S70).

Upon transmitting a transfer end signal to the distant external device (step S71), the CPU 36 checks whether a reception end signal is received from the distant external device (step S72). If a reception end signal is received, the communication processing is terminated.

The above description pertains to the sequence of communication processing executed by the CPU 36 of the digital camera 1.

In this communication processing, a plurality of image data sensed for a panorama image are synthesized into panorama image data, and the panorama image data is transferred to the external device. Instead of this control, control may be changed to transfer the respective images for the panorama image to the external device without being synthesized.

Figure 23A:
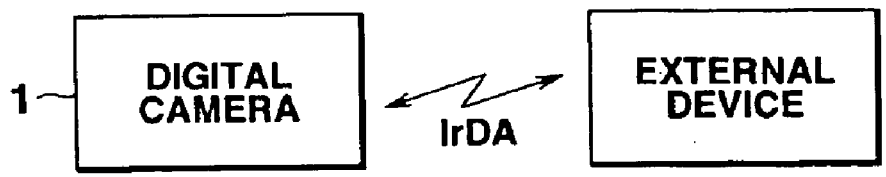
FIGS. 23A, 23B, 23C, and 23D are views showing data communication between the digital camera 1 in FIG. 1 and an external device.

In this communication processing, as shown in FIG. 23A, the panorama image data is transferred from the digital camera 1 to the external device by infrared communication (IrDA scheme). However, the panorama image data may be transferred to the external device by various radio communication schemes using radio waves other than the above infrared communication scheme. In addition, the panorama image data may be transferred to the external device by the data communication forms shown in FIGS. 23B through 23D.

FIGS. 23A through 23D show data communication forms between the digital camera 1 and the external device.

Figure 23B:
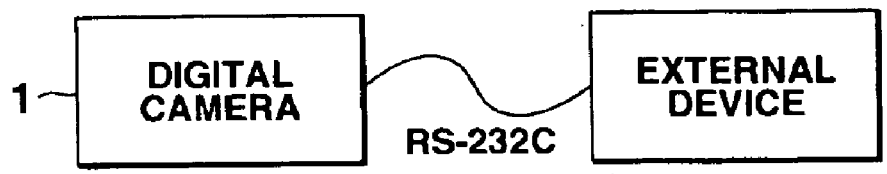
Figure 23C:
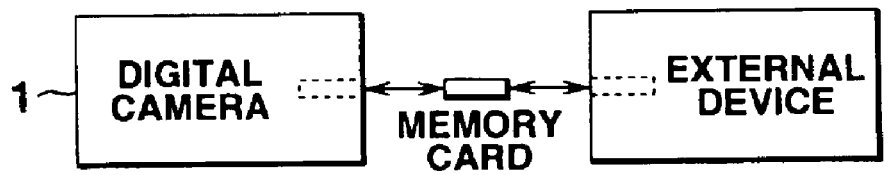
Figure 23D:
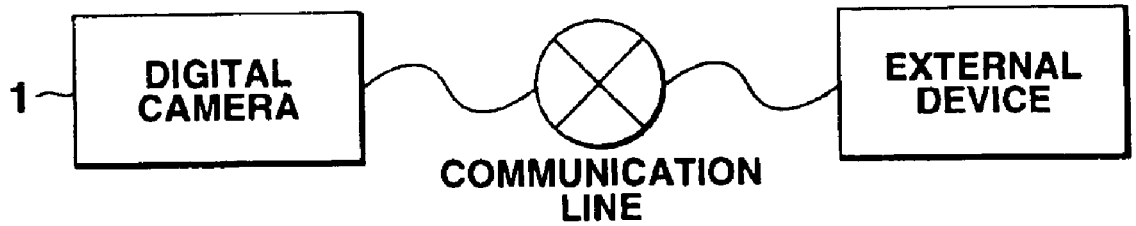

FIG. 23A shows a case wherein data communication performed by infrared communication based on the IrDA scheme. FIG. 23B shows a case wherein data communication is performed through a communication cable (RS-232C type). FIG. 23C shows a case wherein data is exchanged through memory cards. FIG. 23D shows a case wherein data communication is performed through a communication line.

FIG. 23B shows a case wherein both the digital camera 1 and the external device have I/O ports meeting the RS-232C standards, and the digital camera 1 and the external device are connected to each other through a communication cable (RS-232C type). According to the digital camera 1 and the external device connected to each other through the communication cable, panorama image data is transferred from the digital camera 1 to the external device in a serial signal form complying with the RS-232C standards.

FIG. 23C shows a case wherein both the digital camera 1 and the external device have card slots to which memory cards complying with the PCMCIA (Personal Computer Memory Card International Association) standards, and data is exchanged between the digital camera 1 and the external device through memory cards. According to the digital camera 1 and the external device having these card slots, panorama image data is stored in the memory card in the digital camera 1, and this memory card is inserted into the card slot of the external device, thereby transferring the panorama image data from the digital camera 1 to the external device. Obviously, when data transfer is to be performed through such a storage medium, the storage medium is not limited to the memory card, and other storage media, e.g., a semiconductor memory, a magnetic storage medium, and an optical storage medium, can be used.

FIG. 23D shows a case wherein both the digital camera 1 and the external device have data communication functions corresponding to a communication line, and the digital camera 1 is connected to the external device through a predetermined communication line (e.g., a public network or LAN). According to the digital camera 1 and the external device connected to each other through this communication line, panorama image data is transferred from the digital camera 1 to the external device in a signal form corresponding to the communication line.

The present invention has been described in detail with reference to the embodiment. Obviously, however, the present invention is not limited to the embodiment described above, and various modifications can be made within the spirit and scope of the invention.

In the above embodiment, a plurality of image data sensed for a panorama image are separately stored in the flash memory 31. In reproduction/display or data transfer, the plurality of image data for the panorama image are synthesized into panorama image data to be reproduced/displayed on the display unit 12 or transferred to an external device. Instead of such a control configuration, control may be changed to synthesize the plurality of sensed image data for the panorama image into panorama image data, and store this panorama image data in the flash memory 31.

In the above embodiment, various control programs are stored in the ROM, and image data obtained by synthesizing sensed image data and a title image is stored in the flash memory. However, storage media for storing these control programs and image data are not limited to the ROM and a semiconductor memory such as a flash memory. For example, magnetic and optical storage media can be used. In addition, this storage medium may be detachably mounted in the apparatus body.

In the above embodiment, panorama image generated by synthesizing a plurality of sensed image data is reproduced/displayed. However, the present invention can be applied to a case wherein panorama image generated by cutting the upper and lower portions of one sensed image data or the image sensed by an image sensing element (or effective pixels) having an aspect ratio different from that of the display unit is reproduced/displayed.

In addition, the present invention can be applied to a photographed image reproducing apparatus capable of reproducing/displaying photographed image data having an aspect ratio different from that of the display unit as well as an electronic still camera.

As is apparent, for example, the present invention can be applied to a portable electronic device or a personal computer which exhibits an image sensing function upon attachment of a PC camera card or the like having a CCD camera and complying with the PCMCIA standards.

What is claimed is:

1. An electronic still camera comprising:
   photographing means for acquiring image data having an aspect ratio different from that of an image display unit and image data having an aspect ratio substantially equal to that of the image display unit;
   compression means for compressing the image data acquired by the photographing means;
   memory means for storing a plurality of the compressed image data compressed by the compression means;
   mode setting means for manually setting a play mode to display the compressed image data stored in the memory means on the image display unit;
   selection means for selecting at least one of the plurality of compressed image data stored in the memory means, if the play mode is set by the mode setting means;
   expansion means for expanding the compressed image data selected by the selection means;
   discrimination means for discriminating whether the aspect ratio of the compressed image data selected by the selection means is different from that of the image display unit or substantially equal to that of the image display unit;
   first display control means for, if the discrimination means discriminates that the aspect ratio of the compressed image data is different from that of the image display unit, displaying partial image data which is a part of said expanded image data expanded by the expansion means on the image display unit;
   second display control means for, if the discrimination means discriminates that the aspect ratio of the compressed image data is substantially equal to that of the image display unit, displaying an entirety of the expanded image data expanded by the expansion means on the image display unit; and
   third display control means for, when the partial image data displayed on the image display unit is displayed by the first display control means, performing notification that the displayed image is the partial image data of the image data having the aspect ratio different from that of the image display unit.

2. The electronic still camera according to claim 1, wherein the notification display is performed to indicate which part of the image data is displayed by the image display unit.

3. The electronic still camera according to claim 1, wherein the first display control means comprises scrolling control means for urging the image display unit to scroll an entire body of the image data by consecutively changing/controlling the partial image data to be displayed by the image display unit.

4. The electronic still camera according to claim 3, wherein the camera comprises scrolling designation means for designating scrolling of the image data in the image display unit, and wherein the scrolling control means urges the image display unit to scroll the entire body of the image data by consecutively changing/controlling the partial image data to be displayed by the image display unit in accordance with an instruction from the scrolling designation means.

5. The electronic still camera according to claim 1, wherein the first display control means urges the image display unit to display the partial image data at one of an end of the image data and a center of the image data.

6. An electronic still camera comprising:
   photographing means for acquiring image data having an aspect ratio different from that of an image display unit;
   display control means for urging the image display unit to display the image data acquired by the photographing means;
   scrolling control means for, when the image data acquired by the photographing means is to be displayed on the image display unit, urging the image display unit to display partial image data of the image data and also urging the image display unit to scroll an entire body of the image data by consecutively changing/controlling the partial image data to be displayed by the image display unit;
   wherein the scrolling control means comprises:
      first scrolling control means for urging the image display unit to scroll the entire body of the image data in a first scroll direction;
      determination means for determining whether partial image data corresponding to an end of the image data is displayed on the image display unit when the first scrolling control means scrolls the entire body of the image data in a first scroll direction on the image display unit; and second scrolling control means for changing direction of scrolling the entire body of the image data to a second scroll direction opposite to the first scroll direction, when the determination means determines that the partial image data corresponding to the end of the image data is displayed on the image display unit.

7. An electronic still camera comprising:

photographing means for acquiring image data having an aspect ratio different from that of an image display unit and image data having an aspect ratio substantially equal to that of the image display unit;

compression means for compressing the image data acquired by the photographing means;

memory means for storing a plurality of the compressed image data compressed by the compression means;

mode setting means for manually setting a play mode to display the compressed image data stored in the memory means on the image display unit;

selection means for selecting at least one of the plurality of the compressed image data stored in the memory means, if the play mode is set by the mode setting means;

expansion means for expanding the compressed image data selected by the selection means;

discrimination means for discriminating whether the compressed image selected by the selection means has an aspect ratio different from that of the image display unit; and scrolling control means for starting scrolling of the expanded image data to urge the image display unit to display partial image data which is a part of the expanded image data expanded by the expansion means and to urge the image display unit to display an entire body of the expanded image data when the discrimination means discriminates that the expanded image data has an aspect ratio different from that of the image display unit.

8. The electronic still camera according to claim 7, further comprising display control means for, when the discrimination means discriminates that the compressed image data has the aspect ratio substantially equal to that of the image display unit, urging the image display unit to display the entire body of the expanded image data expanded by the expansion means.

9. The electronic still camera according to claim 7, wherein the selection means includes selection control means for sequentially switching/selecting at least one of the plurality of compressed image data stored in the memory means.

10. An electronic still camera comprising:

photographing means for acquiring landscape image data and portrait image data, each having an aspect ratio different from that of an image display unit;

compression means for compressing the landscape image data and portrait image data acquired by the photographing means;

memory means for storing a plurality of the compressed image data compressed by the compression means;

mode setting means for manually setting a play mode to display the compressed image data stored in the memory means on the image display unit;

selection means for selecting at least one of the plurality of the compressed image data stored in the memory means, if the play mode is set by the mode setting means;

expansion means for expanding the compressed image data selected by the selection means;

display control means for urging the image display unit to display partial image data which is part of the expanded image data expanded by the expansion means;

discrimination means for discriminating whether the compressed image data selected by the selection means is landscape image data or portrait image data;

first scrolling control means for, when the discrimination means discriminates that the compressed image data is landscape image data, urging the image display unit to scroll an entire body of the landscape image data by consecutively changing/controlling the partial image data to be displayed by the image display unit in a horizontal direction; and second scrolling control means for, when the discrimination means discriminates that the compressed image data is portrait image data, urging the image display unit to scroll by consecutively changing/controlling the partial image data to be displayed by the image display unit in a vertical direction.

11. The electronic still camera according to claim 10, further comprising scrolling designation means for designating scrolling of the image data in the image display unit, wherein the discrimination means discriminates whether the image data for which scrolling is designated is landscape image data or portrait image data, and wherein the first scrolling control means scrolls in a horizontal direction in accordance with an instruction from the scrolling designation means if the discrimination means discriminates that the image data is landscape image data, and the second scrolling control means scrolls in a vertical direction in accordance with an instruction from the scrolling designation means if the discrimination means discriminates that the image data is portrait image data.

12. An image reproducing method comprising:

acquiring compressed image data having an aspect ratio different from that of an image display unit and compressed image data having an aspect ratio substantially equal to that of the image display unit;

storing a plurality of the acquired compressed image data;

manually setting a play mode to display the stored compressed image data on the image display unit;

selecting at least one of the plurality of the stored compressed image data, if the play mode is set;

discriminating whether the selected compressed image has an aspect ratio different from that of the image display unit or substantially equal to that of the image display unit:

expanding the selected compressed image data;

if the selected image data is discriminated as having the aspect ratio different from that of the image display unit, displaying partial image data which is a part of said expanded image data on the image display unit and displaying a notification that the displayed image is the partial image data; and if the selected image data is discriminated as having the aspect ratio substantially equal to that of the image display unit, displaying an entirety of the expanded image data on the image display unit.

13. An image reproducing method comprising:

acquiring compressed image data having an aspect ratio different from that of an image display unit and compressed image data having an aspect ratio substantially equal to that of the image display unit;

storing a plurality of the acquired compressed image data;

manually setting a play mode to display the stored compressed image data on the image display unit;

selecting at least one of the plurality of the stored compressed image data, if the play mode is set;

discriminating whether the aspect ratio of the selected compressed image data is different from that of the image display unit;

expanding the selected compressed image data;

starting scrolling of the compressed image data to urge the image display unit to display partial image data which is a part of the expanded image data and to urge the image display unit to display an entire body of the expanded image data when the aspect ratio of the compressed image data is discriminated to be different from that of the image display unit.

14. An image reproducing method comprising:

acquiring image data having an aspect ratio different from that of an image display unit;

scrolling the image data to urge the image display unit to display partial image data of the image data and to also urge the image display unit to scroll an entirety of the image data in a first scroll direction by consecutively changing/controlling the partial image data to be displayed by the image display unit in the first scroll direction, when the image data is to be displayed on the image display unit;

determining whether partial image data corresponding to an end of the image data is displayed on the image display unit, when the entire body of the image data is scrolled in a first scroll direction on the image display unit; and changing direction of scrolling the entire body of the image data to a second scroll direction opposite to the first scroll direction, when it is determined that the partial image data corresponding to the end of the image data is displayed on the image display unit.

15. An image reproducing method comprising:

acquiring compressed landscape image data and compressed portrait image data, each having an aspect ratio different from that of an image display unit;

storing a plurality of the acquired compressed image data;

manually setting a play mode to display the stored compressed image data on the image display unit:

selecting at least one of the plurality of stored compressed image data, if the play mode if set by the mode setting means;

expanding the selected compressed image data;

displaying partial image data which is a part of the expanded image data;

discriminating whether the selected compressed image data is landscape image data or portrait image data;

when it is discriminated that the compressed image data is landscape image data, urging the image display unit to scroll an entire body of the landscape image data by consecutively changing/controlling the partial image data to be displayed by the image display unit in a horizontal direction; and when it is determined that the compressed image data is portrait image data, urging the image display unit to scroll an entire body of the portrait image data by consecutively changing/controlling the partial image data to be displayed by the image display unit in a vertical direction.

* * * * *